United States Patent [19]
Tsujiuchi et al.

[11] Patent Number: 4,998,286
[45] Date of Patent: Mar. 5, 1991

[54] CORRELATION OPERATIONAL APPARATUS FOR MULTI-DIMENSIONAL IMAGES

[75] Inventors: Junpei Tsujiuchi, Kawasaki; Toshio Honda, Yokohama; Nagaaki Ohyama, Kawasaki; Eric Badique, Tokyo; Susumu Kikuchi; Yasuhiro Komiya, both of Hachioji, all of Japan

[73] Assignee: Olympus Optical Co., Ltd., Tokyo, Japan

[21] Appl. No.: 146,162

[22] Filed: Jan. 20, 1988

[30] Foreign Application Priority Data

Feb. 13, 1987 [JP] Japan .................................. 62-29544
Jul. 7, 1987 [JP] Japan .................................. 62-167751
Dec. 4, 1987 [JP] Japan .................................. 62-305895

[51] Int. Cl.[5] .............................................. G06K 9/68
[52] U.S. Cl. ......................................... 382/34; 382/17; 382/42
[58] Field of Search .................. 382/1, 17, 18, 34, 41, 382/42, 44, 45; 358/27-29, 80, 88, 98, 296; 364/526, 725, 728; 356/2, 12

[56] References Cited

U.S. PATENT DOCUMENTS

| | | | |
|---|---|---|---|
| 3,816,722 | 6/1974 | Sakoe et al. | 364/728.05 |
| 3,952,299 | 4/1976 | Hodge et al. | 382/42 |
| 3,984,671 | 10/1976 | Fletcher et al. | 364/728.05 |
| 4,446,531 | 5/1984 | Tanaka | 367/728.05 |
| 4,545,025 | 10/1985 | Hepner et al. | 364/728.03 |

Primary Examiner—David K. Moore
Assistant Examiner—Jose L. Couso
Attorney, Agent, or Firm—Armstrong, Nikaido, Marmelstein, Kubovcik, & Murray

[57] ABSTRACT

A correlation operational apparatus for multi-dimensional images includes: means for reducing at least two-dimensional components of the multi-dimensional images composed of at least two components by at least one component by projecting a vector representing the image onto a space perpendicular to a vector representing a large variance of distribution of the multi-dimensional image in a vector space whose orthogonal axes represent the individual dimensional component values of the multi-dimensional image; and means for performing a correlation operation for each component on the multi-dimensional images whose dimensional components have been reduced by at least one. In consequence, images having a relatively high number of high spatial frequency components and whose components have been reduced by at least one are extracted, and a correlation operation is performed thereon.

2 Claims, 16 Drawing Sheets

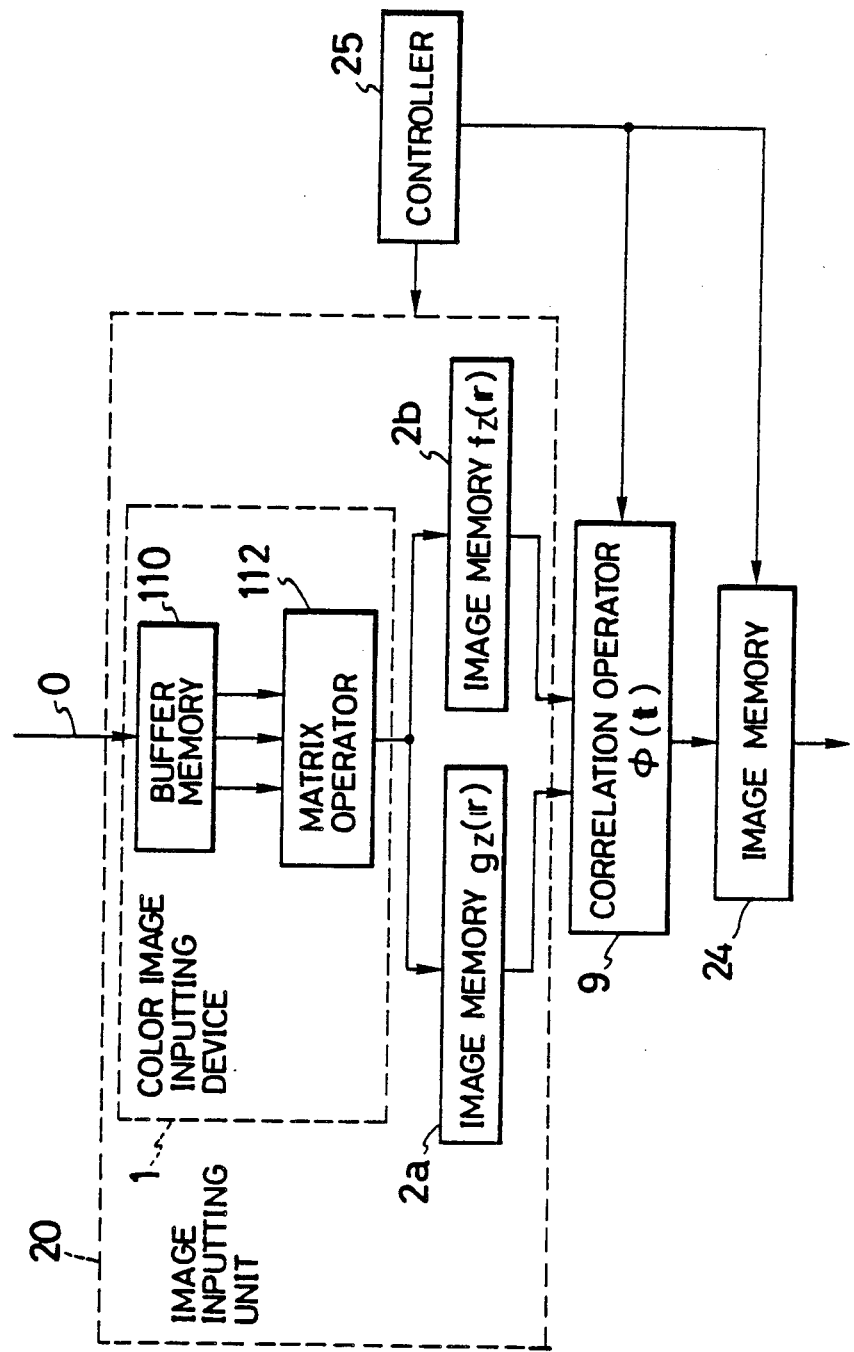

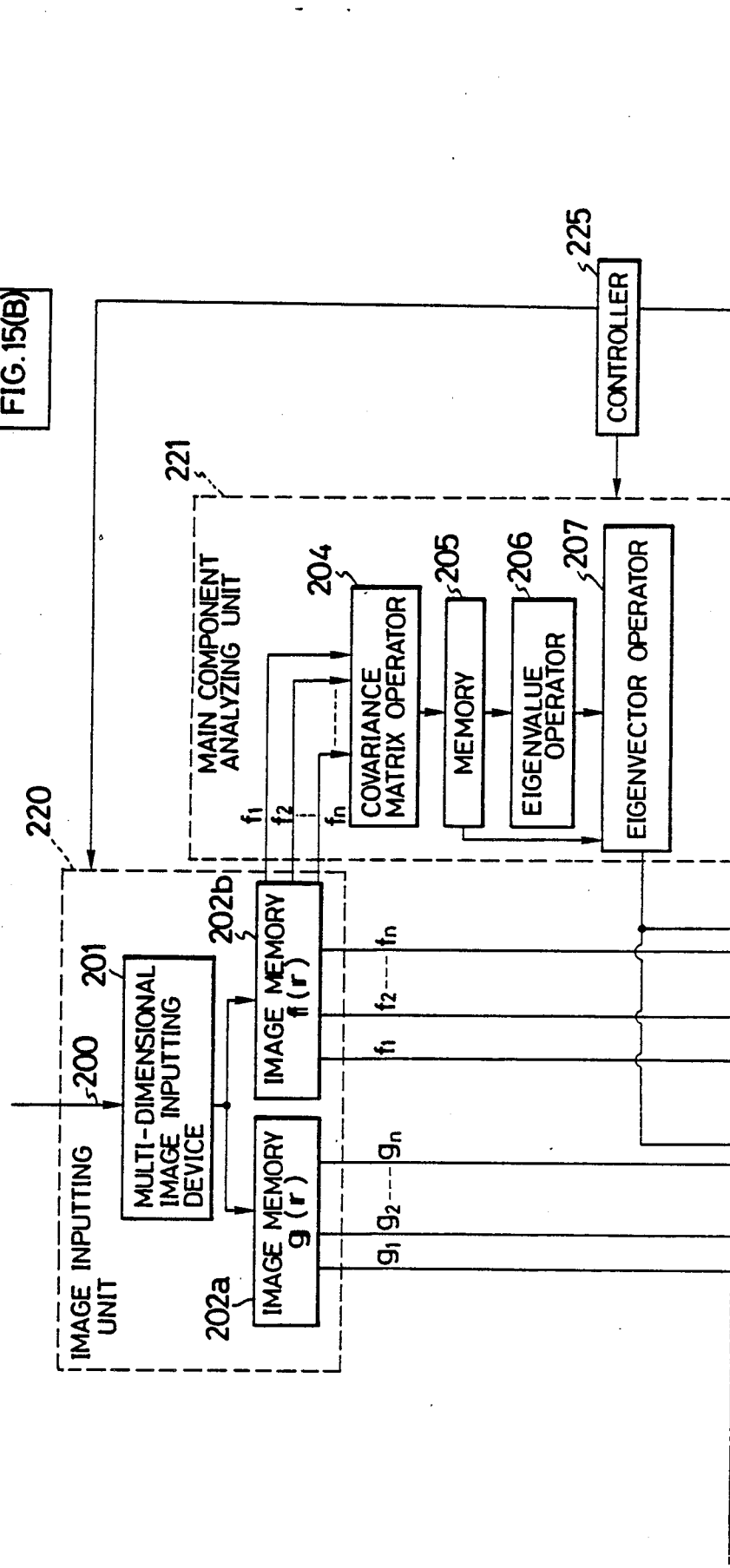

CORRELATION OPERATIONAL APPARATUS FOR MULTI-DIMENSIONAL IMAGES

BACKGROUND OF THE INVENTION

1. Field of the Invention

The present invention relates to a correlation operational apparatus for multi-dimensional images which performs a correlation operation on multi-dimensional images such as color images, and which can be used in stereo matching or image recognition.

2. Description of the Prior Art

In image recognition or stereo matching techniques utilized in extracting contours from aerial photographs, it is essential to improve the accuracy of correlation operations conducted on images. Various techniques of improving the accuracy of these correlation operations in stereo matching have been introduced in "Measurements of Three-Dimensional Surfaces for Two-Dimensional Images" from page 31 to page 36 of 17th Image Engineering Conference Papers 2-1, issued in 1986. These techniques involve the provision of geometrical constraints, verification of a three-dimensional position obtained from two images by means of a third eye, or tracking of a corresponding point by a slowly-moving camera for searching one of the images for an area which corresponds to an object area in the other image.

Although any of these techniques is effective in improving accuracy, most of them are not practical because they are impossible to produce or because the algorithms they use too complicated. Further, the above-described literature has introduced only techniques for variable density images, and does not propose techniques for improving the accuracy of correlation operations by handling multi-dimensional images such as color images which increase the amount of information.

Conventionally, since only techniques for conducting correlation operations on variable density images are known, multi-dimensional images which are colored must be handled as variable density images when correlation operations are conducted thereon. However, handling multi-dimensional images as variable density images does not ensure optimal correlation operation of multi-dimensional images which are thought to contain much more information than variable density images. Further, if the three primary color components that constitute a color image are separately handled and the results of correlation operations on the consequent three variable density images are added, the quantities of calculations are enormously increased whereas the accuracy of the correlations remains substantially the same. Most of the conventional techniques used in stereo matching for improving the accuracy of correlation operations are difficult to carry out, as stated previously

SUMMARY OF THE INVENTION

Accordingly, an object of the present invention is to provide an improved correlation operational apparatus for multi-dimensional images which can obviate the above-described problems of the known image correlation operation techniques, which is capable of greatly improving the accuracy as well as decreasing the quantities of calculations when compared with the handling of variable density images, and which is therefore very useful.

To this end, the present invention provides a correlation operational apparatus for multi-dimensional images which comprises: a device for reducing at least two-dimensional components of the multi-dimensional images, composed of at least two components, by at least one component by projecting a vector representing the images onto a space which is perpendicular to a vector that represents a large variance of distribution of the multi-dimensional image in a vector space whose orthogonal axes represent the individual dimensional component values of the multi-dimensional image: and a device for performing a correlation operation for each component on the multi-dimensional images whose dimensional components have been reduced by at least one.

In consequence, images having relatively a high number of spatial frequency components are extracted so as to enable a correlation operation to be conducted with a high degree of accuracy. Further, since correlation calculations are conducted on multi-dimensional images whose multi-dimensional components have been reduced by at least one, so as to make their components effective in the correlation operation, the quantities of calculations can be decreased.

BRIEF DESCRIPTION OF THE DRAWINGS

FIG. 14 is a block diagram of a tenth embodiment of the present invention;

FIGS. 15A-B are a block diagram of an eleventh embodiment of the present invention;

DETAILED DESCRIPTION OF THE INVENTION

Figure 1:
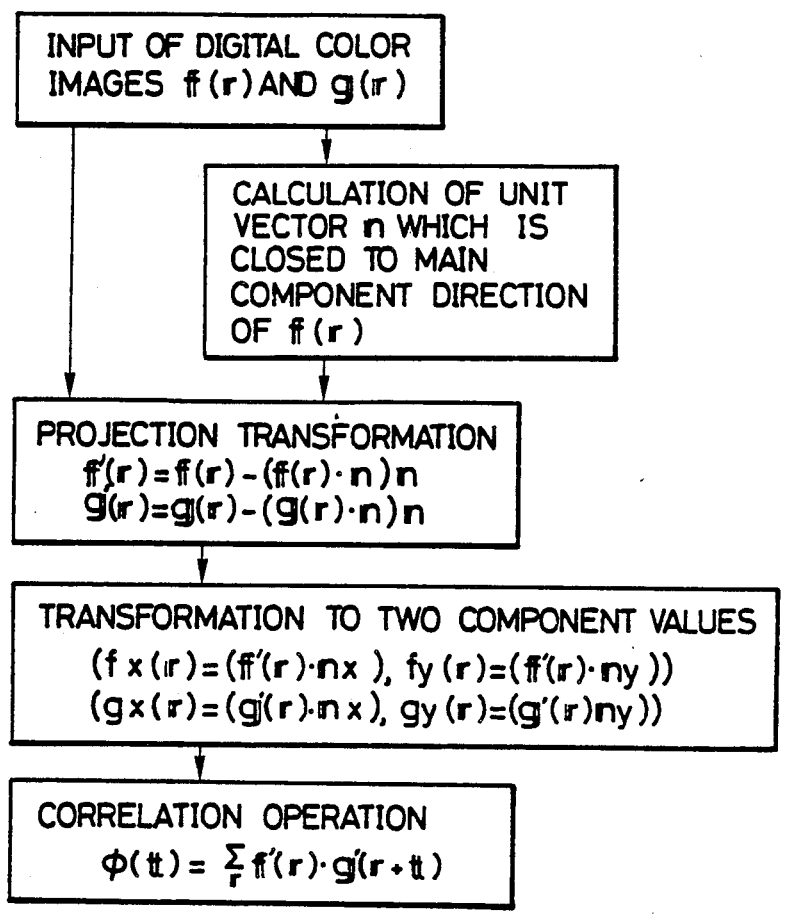
FIG. 1 is a flowchart of a basic processing of a correlation operation which is conducted on two components by a correlation operational apparatus for color images according to the present invention.

The basic operation of a typical correlation operation which is conducted on two component values of color images by a correlation operational apparatus for multi-dimensional images according to the present invention will be described below with reference to FIG. 1. First, two digital color images f(r) and g(r), which are each composed of three-dimensional components red (R), green (G), and blue (B) and which are expressed by Equations (1) below, are input.

$$f(r) = f(x, y) = (R_f, G_f, B_f)$$
$$g(r) = g(x, y) = (R_g, G_g, B_g) \quad (1)$$

Next, in one [f(r) in this case] of the two color images f(r) and g(r), a unit vector $n = (n_1, n_2, n_3)$ which is the closest to the largest variance direction (main component direction) in the three-dimensional R, G and B space is obtained. Subsequently, the component values of the color images f(r) and g(r) are projected onto a plane (hereinafter referred to as a projection plane) perpendicular to the unit vector n in the R, G, and B space (this projection being hereinafter referred to as a projection transformation) so as to express the color images f(r) and g(r) as two component values.

This transformation is expressed using the equations in the manner described below. First, let the images obtained by the projection transformation of the color images f(r) and g(r) be f'(r) and g'(r), and let these projection-transformed images be expressed by:

$$f'(r) = f(r) - \{f(r) \cdot n\} \cdot n$$
$$g'(r) = g(r) - \{g(r) \cdot n\} \cdot n \quad (2)$$

To express the projection-transformed images f'(r) and g'(r) as two components, $n_x = (x_1, x_2, x_3)$ and $n_y = (y_1, y_2, 0)$ are used for unit vectors perpendicular to each other on the projection plane, and the component values of these vectors $n_x$ and $n_y$ are expressed by using the component values $(n_1, n_2, n_3)$ of the unit vector n as follows:

$$\begin{matrix} x_1 = -n_1 n_3 & y_1 = n_2 \\ x_2 = -n_2 n_3 & y_2 = -n_1 \\ x_3 = 1 & y_3 = 0 \end{matrix} \quad (3)$$

The projection-transformed images f'(r) and g'(r) are represented by the unit vectors $n_x$ and $n_y$ on the projecting plane so as to express them as two components $[f_x(r), f_y(r)]$ and $[g_x(r), g_y(r)]$ as follows:

$$f'(r) = f_x(r) \cdot n_x + f_y(r) \cdot n_y$$
$$g'(r) = g_x(r) \cdot n_x + g_y(r) \cdot n_y \quad (4)$$

Figure 2:
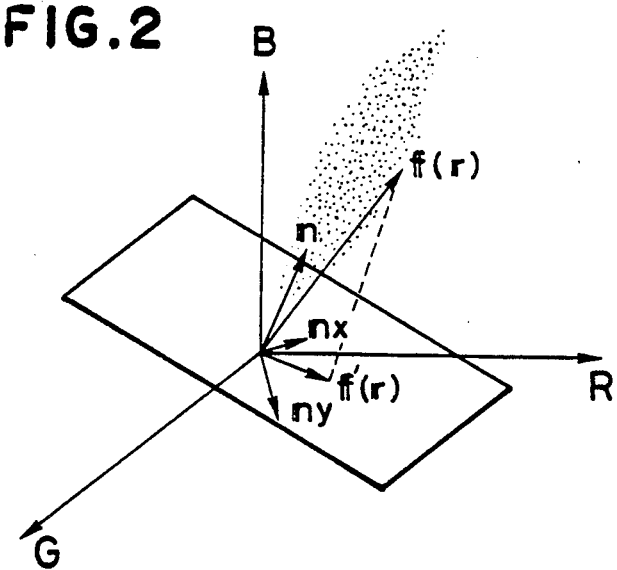
FIG. 2 illustrates a positional relationship between a color image and its unit vectors in a three-dimensional R, G and B space.

FIG. 2 illustrates the positional relationship between these vectors in the three-dimensional R, G, and B space.

A correlation operation expressed by Equation (5) below is performed on the thus-obtained projection transformed images f'(r) and g'(r) expressed as two components, and the results are output.

$$\phi(t) = \sum_r f'(r) g'(r + t) \quad (5)$$

If a correlation operation is to be conducted on a one-component value, the thus-obtained two component values are first transformed into a one-dimensional component by linear combination, and a correlation operation is then conducted thereon.

Thus, since the input color images f(r) and g(r) are projected onto a plane perpendicular to a vector which is closest to the main component direction, images having a relatively high number of high spatial frequency components are extracted so as to enable a highly accurate correlation operation. Further, since the three primary color components of a color image are transformed into two or one component which is effective for a correlation operation and a correlation operation is then performed on the consequent two or one component, the quantities of calculations can be decreased.

[EMBODIMENTS]

Preferred embodiments of the present invention will now be described in detail with reference to the accompanying drawings.

(First Embodiment)

Figure 3:
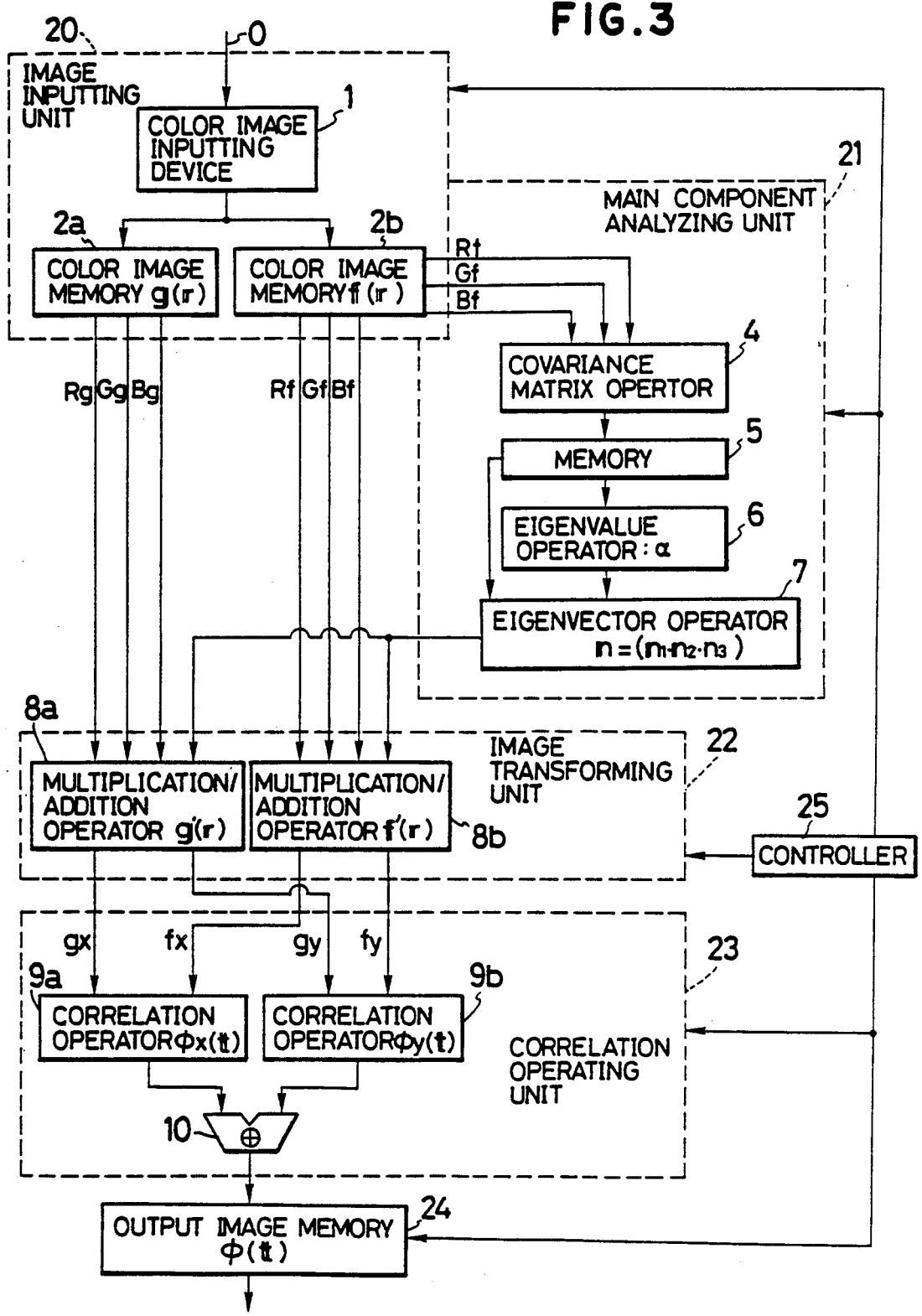
FIG. 3 is a block diagram of a first embodiment of the present invention.

FIG. 3 is a block diagram of a first embodiment of the present invention. This correlation operational apparatus for color images includes: an image inputting unit 20 consisting of a color image inputting device 1 and color image memories 2a and 2b; a main component analyzing unit 21 consisting of a covariance matrix operator 4, a memory 5, an eigenvalue operator 6, and an eigenvector operator 7; an image transforming unit 22 consisting of multiplication/addition operators 8a and 8b; a correlation operating unit 23 consisting of correlation operators 9a and 9b; an output image memory 24; and a controller 25 comprised of, for example, a CPU for controlling the operations of these constituents.

The structure of each constituent of the apparatus and the operation thereof will be described below. Two color images 0 are input to the color image inputting device 1 where they are converted into digital color images f(r) and g(r) having R, G and B three primary color components and suitable size and gradient, and the results are stored in the color image memories 2a and 2b, respectively. The color image inputting device 1 may be a drum scanner, if the input color images 0 are silver salt photographs. It may be a unit comprised of a combination of a matrix circuit and an A/D converter, if an NTSC signal is to be input. For R, G and B signals, it may be an A/D converter. It may alternatively be a unit comprised of a timing converter and a bus converter for digital R, G, and B signals.

Subsequently, the three component values $[R_f(r), G_f(r), B_f(r)]$ of the color image f(r) which has been stored in the color image memory 2b are input to the covariance matrix operator 4. The covariance matrix operator 4 is comprised by a squarer, a multiplier, an adder, and an accumulator, and is adapted to calculate covariance values $\sigma_{RR}^2, \sigma_{GG}^2, \sigma_{BB}^2, \sigma_{RG}^2, \sigma_{GB}^2, \sigma_{BR}^2$ of each of the three component values $[R_f(r), G_f(r), B_f(r)]$.

A covariance matrix $V_i$ is defined here as follows:

$$V = \begin{pmatrix} \sigma^2_{RR}\sigma^2_{RG}\sigma^2_{BR} \\ \sigma^2_{RG}\sigma^2_{GG}\sigma^2_{GB} \\ \sigma^2_{BR}\sigma^2_{GB}\sigma^2_{BB} \end{pmatrix} = \begin{pmatrix} <R_f^2> - <R_f>^2 & <R_fG_f> - <R_f><G_f> & <B_fR_f> - <B_f><R_f> \\ <R_fG_f> - <R_f><G_f> & <G_f^2> - <G_f>^2 & <G_fB_f> - <G_f><B_f> \\ <B_fR_f> - <B_f><R_f> & <G_fB_f> - <G_f><B_f> & <B_f^2> - <B_f>^2 \end{pmatrix} \quad (6)$$

where $<x> = \frac{1}{N} \sum_r x(r)$

N: the number of picture elements of an object image
The covariance matrix elements are stored in the memory 5. They are also input to the eigenvalue operator 6 to solve a proper equation expressed by Equation (7).

$$VA = \alpha A \quad (7)$$

where $A = (A_1, A_2, A_3)^t$: an eigenvector and $\alpha$: an eigenvalue.

The eigenvalue operator 6 is a circuit that calculates only the largest root of Equation (8) for obtaining the eigenvalue $\alpha$, and which is comprised of a multiplier, a divider, an adder and a table conversion memory. In Equation (8), E denotes a unit matrix.

$$\begin{aligned} |V - \alpha E| &= \begin{vmatrix} \sigma^2_{RR} - \alpha & \sigma^2_{RG} & \sigma^2_{BR} \\ \sigma^2_{RG} & \sigma^2_{GG} - \alpha & \sigma^2_{GR} \\ \sigma^2_{BR} & \sigma^2_{GB} & \sigma^2_{BB} - \alpha \end{vmatrix} \\ &= (\sigma^2_{RR} - \alpha)(\sigma^2_{GG} - \alpha)(\sigma^2_{BB} - \alpha) - \\ &\quad (\sigma^2_{RR} - \alpha)\sigma^2_{GB} - (\sigma^2_{GG} - \alpha)\sigma^2_{BR} - \\ &\quad (\sigma^2_{BB} - \alpha)\sigma^2_{RG} \\ &= 0 \end{aligned} \quad (8)$$

Subsequently, the covariance matrix elements which have been stored in the memory 5 and the output $\alpha$ from the eigenvalue operator 6 are both input to the eigenvector operator 7, where the components $(n_1, n_2, n_3)$ of an eigenvector n for the eigenvalue $\alpha$ are calculated on the basis of Equation (9), and the results are stored in a register provided in the eigenvector operator 6.

From $(V - \alpha E)n = 0$, $$\begin{aligned} n_1 &= \frac{1}{\sqrt{A_1^2 + A_2^2 + 1}} A_1 \\ n_2 &= \frac{1}{\sqrt{A_1^2 + A_2^2 + 1}} A_2 \\ n_3 &= \frac{1}{\sqrt{A_1^2 + A_2^2 + 1}} \end{aligned} \quad (9)$$

where $$A_1 = \frac{\sigma^2_{RG}\sigma^2_{GB} - \sigma^2_{BR}(\sigma^2_{GG} - \alpha)}{(\sigma^2_{RR} - \alpha)(\sigma^2_{GG} - \alpha) - \sigma^2_{RG}}, \text{ and}$$

$$A_2 = \frac{-(\sigma^2_{RR} - \alpha)A_1 - \sigma^2_{BR}}{\sigma^2_{RG}}.$$

Subsequently, the three primary color signals $[R_g(r), G_g(r), B_g(r)]$ and $[R_f(r), G_f(r), B_f(r)]$ of the color images $g(r)$ and $f(r)$ which have been respectively stored in the color image memories 2a and 2b are input to the multiplication/addition operators 8a and 8b, respectively. At the same time, the output $n = (n_1, n_2, n_3)$ from the eigenvector operator 7 is input to both of the multiplication/addition operators 8a and 8b so that a projection transformation expressed by Equation (10) is performed.

$$\begin{pmatrix} f_x \\ f_y \end{pmatrix} = \begin{pmatrix} -n_1n_3 & -n_2n_3 & 1 \\ n_2 & -n_1 & 0 \end{pmatrix} \quad (10)$$

$$\begin{pmatrix} n_2^2 + n_3^2 - n_1n_2 & -n_1n_3 \\ -n_1n_2 & n_1^2 + n_3^2 - n_2n_3 \\ -n_1n_3 & -n_2n_3 & n_1^2 + n_2^2 \end{pmatrix} \begin{pmatrix} R_f \\ G_f \\ B_f \end{pmatrix}$$

$$\begin{pmatrix} g_x \\ g_y \end{pmatrix} = \begin{pmatrix} -n_1n_3 & -n_2n_3 & 1 \\ n_2 & -n_1 & 0 \end{pmatrix}$$

$$\begin{pmatrix} n_2^2 + n_3^2 - n_1n_2 & -n_1n_3 \\ -n_1n_2 & n_1^2 + n_3^2 - n_2n_3 \\ -n_1n_3 & -n_2n_3 & n_1^2 + n_2^2 \end{pmatrix} \begin{pmatrix} R_g \\ G_g \\ B_g \end{pmatrix}$$

Figure 4:
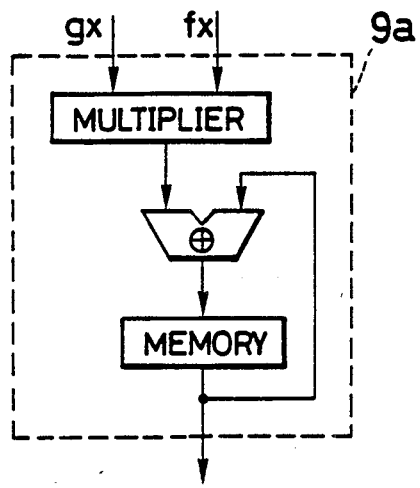
FIG. 4 is a block diagram of a correlation operational unit, showing an example of its structure.
Figure 5:
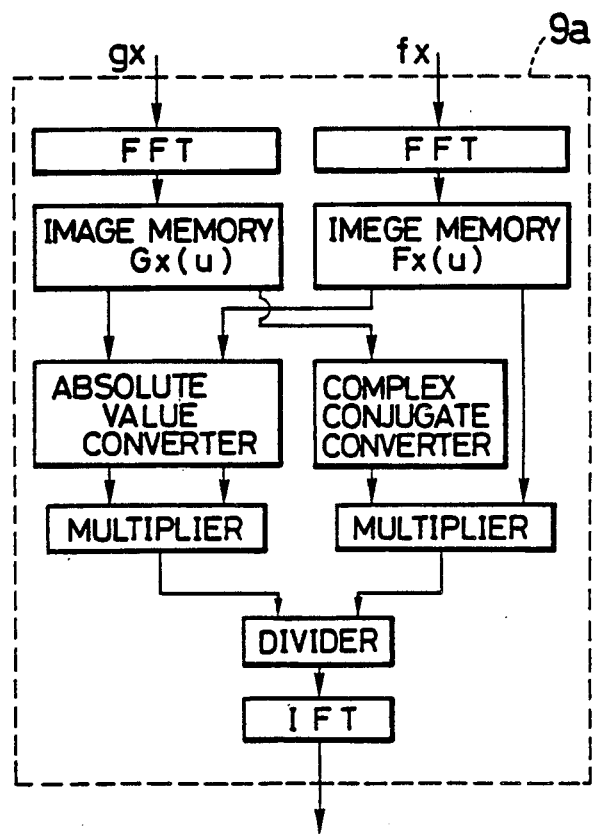
FIGS. 5 and 5A are block diagram of the correlation operational unit, showing another example of its structure.
Figure 6:
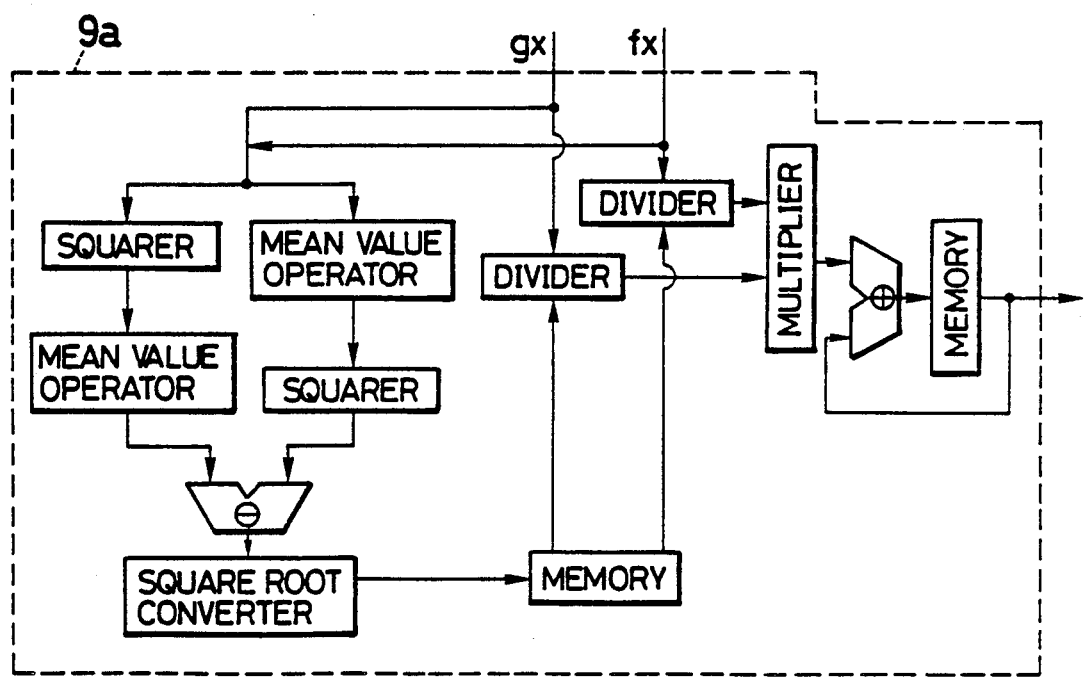
FIG. 6 is a block diagram of the correlation operational unit, showing still another example of its structure.

The color images $g'(r)$ and $f'(r)$, which have been transformed into images composed of two components by the multiplication/addition operators 8a and 8b, are input for each component to the correlation operators 9a and 9b where correlation operations are conducted on these images. The outputs from the correlation operators 9a and 9b are input to the adder 10 where they are added, and the results of the addition are stored in the image memory 24 as a correlated image. Each of the correlation operators 9a and 9b may be a multiplication/addition operator which consists of a multiplier, an adder, and a memory, as shown in FIG. 4, and which is adapted to perform a correlation operation expressed by Equation (11). The correlation operator 9a or 9b may be constructed in such a manner that it incorporates a circuit which performs a fast Fourier transform (FFT), as shown in FIG. 5, so as to enable a correlation operation such as that expressed by Equation (12a) or a phase correlation such as that expressed by Equation (12b) to be performed on frequency images. Alternatively, it may be the one such as that shown in FIG. 6 in which a standard deviation for each component value is calculated beforehand so that each component value is divided by the standard deviation before a multiplication/addition operation is conducted thereon, as shown in Equation (13).

$$\phi_x(t) = \sum_r f_x(r) g_x(r + t) \tag{11}$$

$$\phi_x(t) = \mathcal{F}^{-1}\{F_x(u) \cdot G_x^*(u)\} \tag{12a}$$

$$\phi_x(t) = \mathcal{F}^{-1}\frac{F_x(u) \cdot G_x^*(u)}{|F_x(u)||G_x(u)|} \tag{12b}$$

where $F_x(u) = \{f_x(r)\}$, $G_x(u) = \{g_x(r)\}$, $\mathcal{F}$: operator for Fourier transform, and $\mathcal{F}^{-1}$: an operator for inverse Fourier transform.

$$\phi(t) = \sum_r \frac{f(r) g(r + t)}{\sigma_f \cdot \sigma_g} \tag{13}$$

Figure 5A:
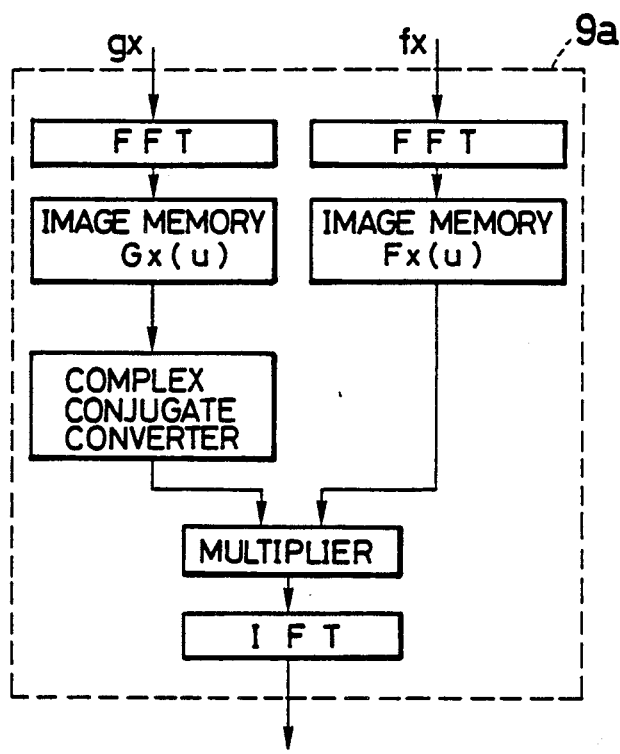

A correlation operator such as that shown in FIG. 5A may also be employed for effecting a correlation operation. This correlation operator is constructed in the manner in which the correlation operator shown in FIG. 5 is structured with its absolute value converter, multiplier that multiplies the output of the absolute value converter and divider that divides the output of the multiplier being removed therefrom.

The correlated image which has been stored in the image memory 24 is utilized to attain various objects by being output to another apparatus or being analyzed by the controller.

In this embodiment, a vector which represents the largest variance in the three-dimensional R, G, and B space is obtained by actually performing main component analysis. In consequence, the most desirable projection transformation of the color images is enabled, enabling a correlation operation to be performed with a high degree of accuracy.

(Second Embodiment)

Figure 7:
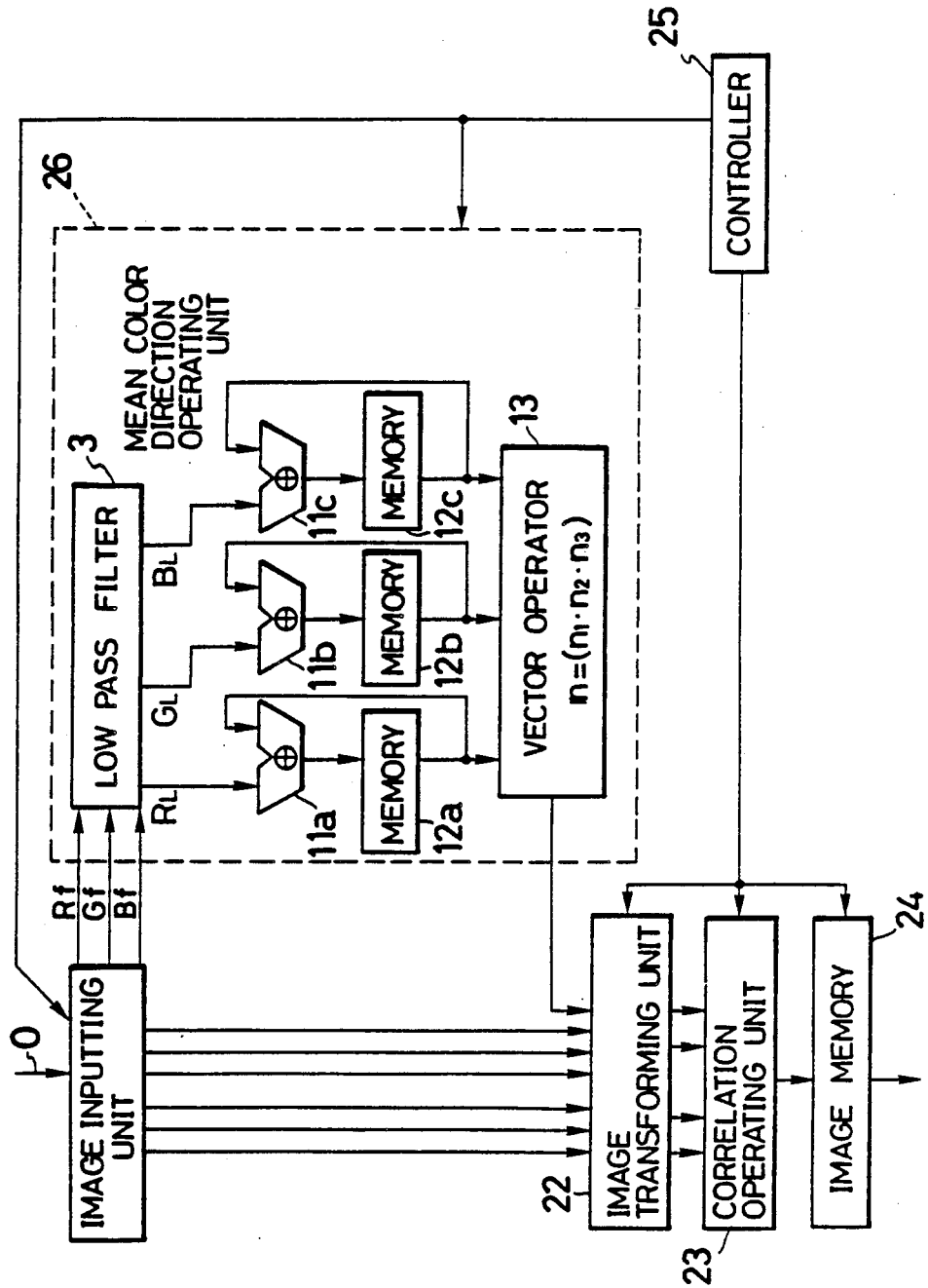
FIG. 7 is a block diagram of a second embodiment of the present invention.

FIG. 7 is a block diagram of a second embodiment of the present invention. The correlation operational apparatus of this embodiment is comprised in the same manner as in the first embodiment with the exception that the main component analyzing unit 21 is replaced by a mean color direction operating unit 26. The mean color direction operating unit 26 is comprised of the low-pass filter 3, adders 11a, 11b, and 11c, memories 12a, 12b, and 12c, and a vector operator 13.

Regarding the operation of the apparatus of this embodiment, the three primary color component values ($R_f$, $G_f$, $B_f$) of one image f(r) of the two color images f(r) and g(r) which have been input to the image inputting unit 20 are input to the low-pass filter 3 in the mean color direction operating unit 26 where the low spatial frequency components thereof are extracted. The three primary color values ($R_L$, $G_L$, $B_L$) of the low spatial frequency area which are output from the low-pass filter 3 are input to the adders 11a to 11c, respectively, where they are added to the accumulated values of those of the previously input picture elements that have been stored in the memories 12a to 12c, and the results of the calculations are again stored in the memories 12a to 12c.

After this addition has been performed on all the picture elements of the color image f(r) the resultant values ($S_R$, $S_G$, $S_B$) in the memories 12a to 12c are input to the vector operator 13 where three component values ($n_1$, $n_2$, $n_3$) of a vector n which determines projection transformation are calculated. More specifically, the following equations are calculated:

$$n_1 = \frac{1}{\sqrt{S_R^2 + S_G^2 + S_B^2}} S_R \tag{14}$$

$$n_2 = \frac{1}{\sqrt{S_R^2 + S_G^2 + S_B^2}} S_G$$

$$n_3 = \frac{1}{\sqrt{S_R^2 + S_G^2 + S_B^2}} S_B$$

The three component values ($n_1$, $n_2$, $n_3$) of the vector n are stored in a register provided in the vector operator 13. The output n = ($n_1$, $n_2$, $n_3$) from the vector operator 13 is input to the image transforming unit 22, as in the first embodiment, where it is used for projection transforming the input color images as the preliminary step of correlation operations conducted by the correlation operational unit 23.

This embodiment utilizes the fact that the R G B primary color images of a color image have a correlation, and that the distribution of the image in the three-dimensional R, G and B space tends to be largely in the lightness direction represented by $Y = C_1 R + C_2 G + C_3 B$. This means that the main component direction actually obtained in the first embodiment and the mean color direction of the low spatial frequency area obtained in this embodiment are very close to each other. Therefore, in this embodiment, the same function and effect as obtained in the first embodiment are ensured by simply and separately adding the three primary color component values of the low spatial frequency area of the color image. Thus, according to this embodiment, the calculations can be simplified, thereby simplifying the apparatus which performs correlation operations with a high degree of accuracy.

(Third Embodiment)

Figure 8:
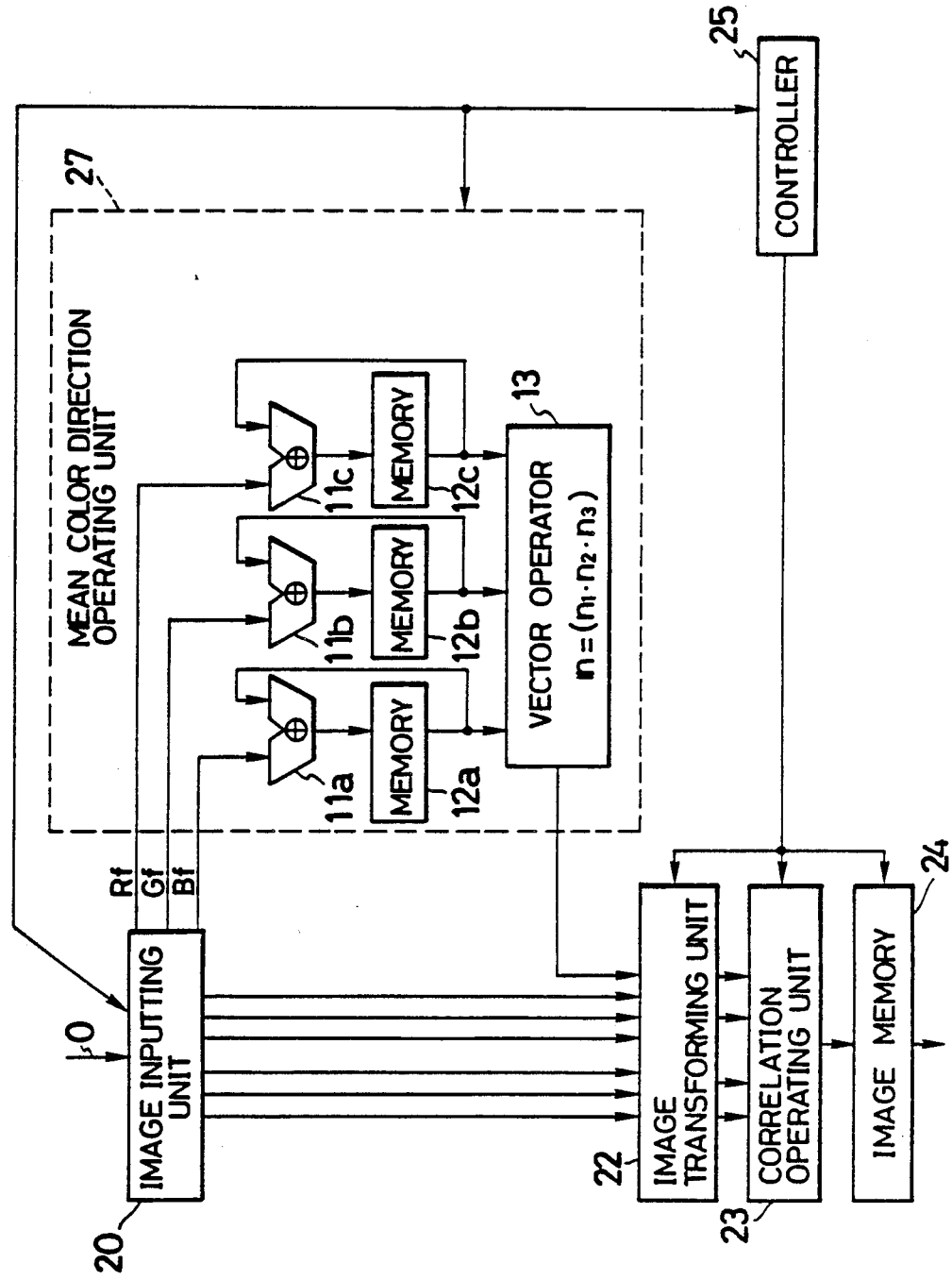
FIG. 8 is a block diagram of a third embodiment of the present invention.

FIG. 8 is a block diagram of a third embodiment of the present invention. The apparatus of this embodiment does not include the low-pass filter 3 that is incorporated in the mean color direction operating unit 26 of the second embodiment. More specifically, in this embodiment, the three primary color component values ($R_f$, $G_f$, $B_f$) of one image f(r) of the two images f(r) and g(r) which have been input to the image inputting unit 20 are directly input to the adders 11a to 11c which perform additions on all the picture elements of the color image f(r) in cooperation with the memories 12a to 12c. The values ($S_R$, $S_G$, $S_B$) which are respectively stored in the memories 12a to 12c are input to the vector operator 13, as in the second embodiment, where the three component values of a vector n that determines the projection transformation are calculated. Thereafter, the projection transformations and the correlation operations are performed in the same manner as in any of the previous embodiments.

This embodiment utilizes the facts that an image has in general a very high number of components of low spatial frequency area, and that calculation of the mean color direction using the components as they are, as in this embodiment, provides substantially the same effect as that obtained by calculating the mean color direction using the low-pass filtered components, as in the second embodiment. Therefore, in this embodiment, the substantially same effect as that obtained in the first and second embodiments can be obtained by simpler calculations of separately adding the three primary color component values of the color image. Thus, according to the third embodiment, the calculations are further simplified, thereby simplifying the apparatus which performs correlation operations with a high degree of accuracy.

(Fourth Embodiment)

Figure 9:
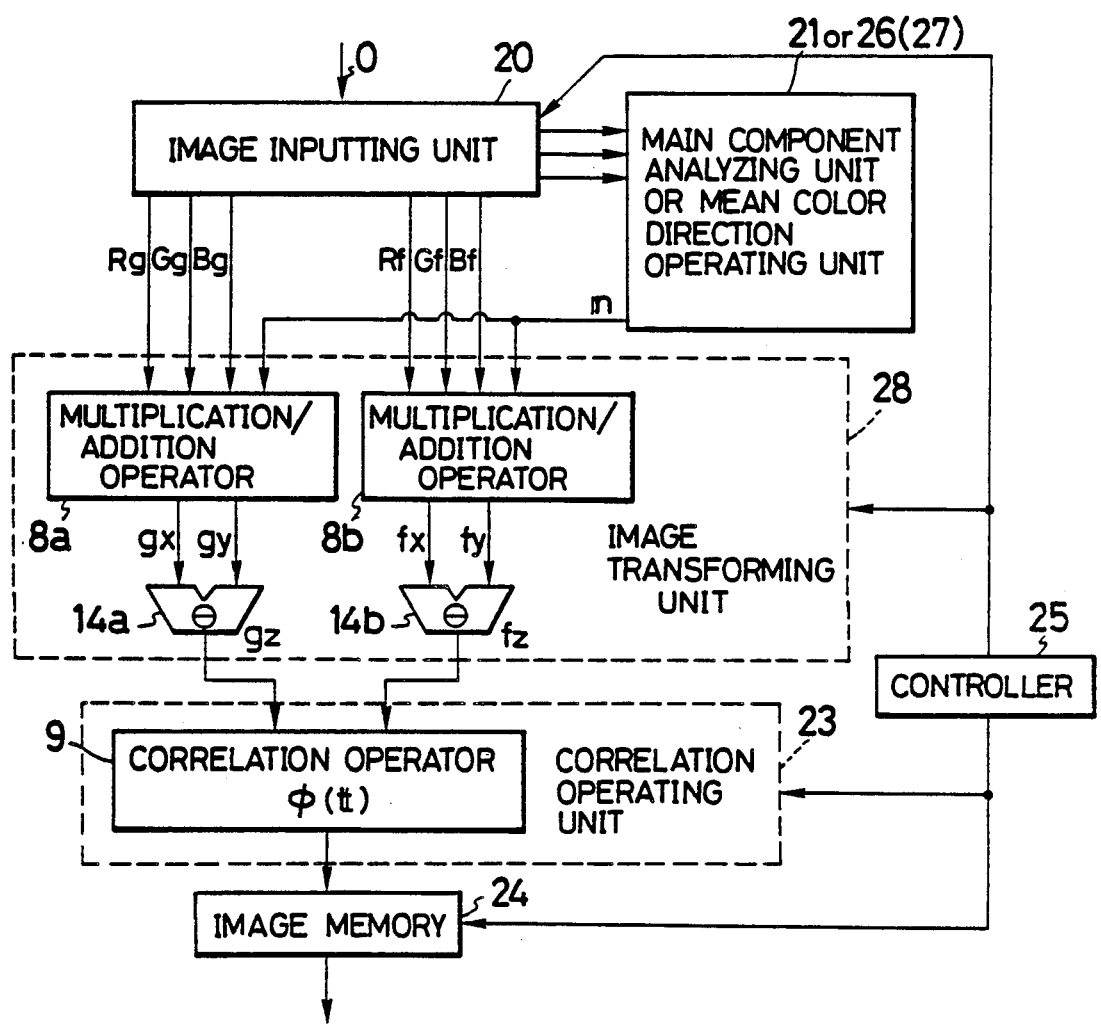
FIG. 9 is a block diagram of a fourth embodiment of the present invention.

FIG. 9 is a block diagram of a fourth embodiment of the present invention. In this embodiment, the two-dimensional components of the color images f'(r) and g'(r) which are produced by the image transforming unit in the first to third embodiments are transformed into one-dimensional components, and the correlation operation is then performed thereon. More specifically, an image transforming unit 28 of this embodiment consists of multiplication/addition operators 8a and 8b, and subtracters 14a and 14b, as shown in FIG. 9. The two-dimensional signals ($g_x$, $g_y$) and ($f_x$, $f_y$) which are respectively produced by the multiplication/addition operators 8a and 8b are input to the subtracters 14a and 14b, respectively, where one-dimensional signals are calculated as follows:

$$g_z = g_x - g_y$$

$$f_z = f_x - f_y \qquad (15)$$

Originally, the two components of the color images f'(r) and g'(r) are linearly combined to obtain one-dimensional signals by:

$$g_z = c_x g_x + c_y g_y$$

$$f_z = c_x f_x + c_y f_y \qquad (16),$$

the coefficients ($c_x$, $c_y$) in Equation (16) being set to the optimal values in accordance with the images. However, it is in general sufficient to set these coefficients to 1, $-1$, respectively, and the calculations are facilitated in this way. Therefore, the present embodiment employs the subtracters 14a and 14b to obtain the one-dimensional signals by Equation (15).

The outputs $g_z$ and $f_z$ from the subtracters 14a and 14b are input to the correlation operator 9 where a correlation operation is performed thereon, and the output of the correlation operator 9 is stored in the image memory 24.

Thus, in this embodiment, the two components which are effective for correlation operations and which are calculated from the three primary color components of the color images are linearly combined to obtain one-dimensional signals and a correlation operation is then conducted thereon. In consequence, the quantities of calculations can be further decreased, thereby reducing the size of the apparatus which is capable of performing a correlation operation with a high degree of accuracy.

(Fifth Embodiment)

Figure 10:
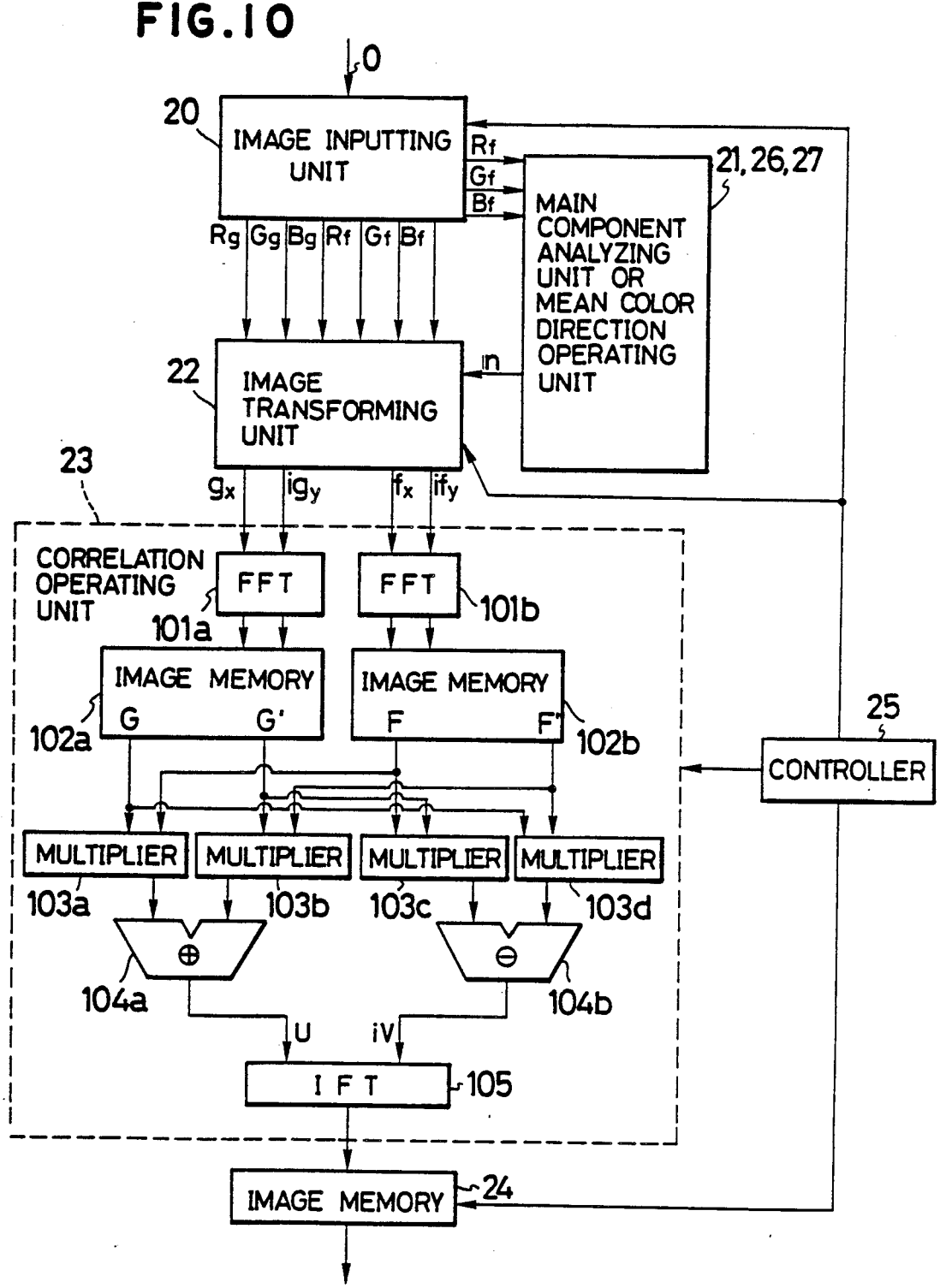
FIG. 10 is a block diagram of a fifth embodiment of the present invention.

FIG. 10 is a block diagram of a fifth embodiment of the present invention. The apparatus of this embodiment includes a correlation operating unit 23 which is constructed in a different way from that in which the correlation operating unit 23 used in the first to third embodiments is structured. In the correlation operating unit 23 of this embodiment the outputs $g_x$, $g_y$, $f_x$, $f_y$ from the image transforming unit 22 are first input to FFT operators 101a and 101b, respectively, as complex number signals $g_c = g_x + ig_y$ and $f_c = f_x + if_y$. The FFT operators 101a and 101b conduct Fourier transform on the complex number signals $g_c$ and $f_c$, and output consequent complex number signals $G_c = G + iG'$ and $F_c = F + iF'$ to image memories 102a and 102b, respectively, where these complex number signals $G_c$ and $F_c$ are stored as real parts and imaginary parts.

At the next stage, the real part G and the real part F are input to a multiplier 103a from the image memories 102a and 102b, respectively, the imaginary part G' and the imaginary part F' are input to a multiplier 103b from the image memories 102a and 102b, respectively, the imaginary part G' and the real part F are input to a multiplier 103c from the image memories 102a and 102b, respectively, and the real part G and the imaginary part F' are input to a multiplier 103d from the image memories 102a and 102b, respectively, so that multiplications are performed on these values in the multipliers 103a, 103b, 103c, and 103d. The outputs from the multipliers 103a and 103b are input to an adder 104a where $U = FG + F'G'$ is calculated, and the outputs from the mulitpliers 103c and 103d are input to a subtracter 104b so as to calculate $V = F'G - FG'$. The outputs of the adder 104a and the subtracter 104b are input to an inverse FFT operator 105 which regards (U+iV) as a complex number signal and which performs an inverse Fourier transform thereon. The real part of the output of the inverse FFT operator 105 is then output as the results of the inverse Fourier transform to the image memory 24.

The operation of this embodiment will now be described using equations. Transformations performed by the FFT operators 101a and 101b are expressed as follows:

$$\{f_x + i f_y\} = F_x + i F_y = (F_{xR} - F_{yI}) + i (F_{xI} + F_{yR}) \qquad (17)$$

$$\{g_x + i g_y\} = G_x + i G_y = (G_{xR} - G_{yI}) + i (G_{xI} + G_{yR}) \qquad (18)$$

where
$\{f_x\} = F_x = F_{xR} + i F_{xI}$
$\{f_y\} = F_y = F_{yR} + i F_{yI}$
$\{g_x\} = G_x = G_{xR} + i G_{xI}$
$\{g_y\} = G_y = G_{yR} + i G_{yI}$ In Equation (17), let the real and imaginary parts be F and F', respectively, and set:
$F = F_{xR} - F_{yI}$, and $F' = F_{xI} + F_{yR}$.

Similarly, in Equation (18), let the real and imaginary parts be G and G', respectively and set:
$G = G_{xR} - G_{yI}$, and $G' = G_{xI} + G_{yR}$.

Correlation between Equations (17) and (18) gives:

$$(F_x + iF_y)(G_x + iG_y)^* \qquad (19)$$

$$= (F + iF')(G - iG')$$

$$= (FG + F'G') + i(F'G - FG')$$

$$= U + iV$$

The four multiplications of FG, F'G', F'G, and FG' in the above Equation (19) are done by the multipliers 103a, 103b, 103c, and 103d shown in FIG. 10 and an addition of (FG+F'G') and subtraction of (F'G−FG') are performed by the adder 104a and subtracter 104b, respectively Equation (19) can also be written as follows:

$$(F_x+i\ F_y)(G_x+i\ G_y)^* = F_xG_x^* + F_yG_y^* + i(F_yG_x^* - F_xG_y^*) \quad (20)$$

Inverse Fourier transform of Equation (20) gives:

$$\bigcirc^{-1} = \{F_xG_x^* + F_yG_y^* + i(F_yG_x^* - F_xG_y^*)\} = f_x \bigcirc g_x + f_y \bigcirc g_y + i(f_y \bigcirc g_x - f_x \bigcirc g_y) \quad (21)$$

where $\bigcirc$ is an operator representing a correlation operation.

From Equation (21), it is clear that the real part $(f_x \bigcirc g_x + f_y \bigcirc g_y)$ represents a correlation between the two-dimensional images $(f_x, f_y)$ and $(g_x, g_y)$.

Thus, in this embodiment, since the two components of the two-dimensional image signal are respectively treated as the real part and the imaginary part of a complex number during the fast Fourier transform (FFT) performed in the correlation operations, the size of the apparatus can be greatly reduced. The quantities of calculations performed can also be greatly reduced so as to enable correlation operations to be conducted at a high speed.

(Sixth Embodiment)

A sixth embodiment of the present invention employs three-dimensional color signals other than (R, G, B) signals as input color image signals 0 in any of the first to fifth embodiments shown in FIGS. 3 to 10. The color signals other than (R, G, B) signals may be (Y, I, Q) signals in an NTSC color TV system. In this embodiment, the flow of the (R, G, B) signals in any of the first to fifth embodiments is replaced by that of (Y, I, Q) signals, if (Y, I, Q) signals are to be employed.

In this way, correlation operations can be performed on any three-dimensional color signals such as color signals transmitted in the NTSC system without transforming them into (R, G, B) signals. This enables the present invention to be applied to any three-dimensional color signals without increasing the size of the apparatus.

(Seventh Embodiment)

This embodiment involves correlation operations performed only on two signals of three-dimensional signals, such as (I, Q) signals in (Y, I, Q) signals in the NTSC system which are composed of a Y signal representing brightness and biaxial components (I, Q) defined in planes perpendicular to the brightness, i.e., in planes representing hue and saturation, in color space. The above-described color space is defined to be a space whose orthogonal three axes represent the three-dimensional components of a color.

Figure 11:
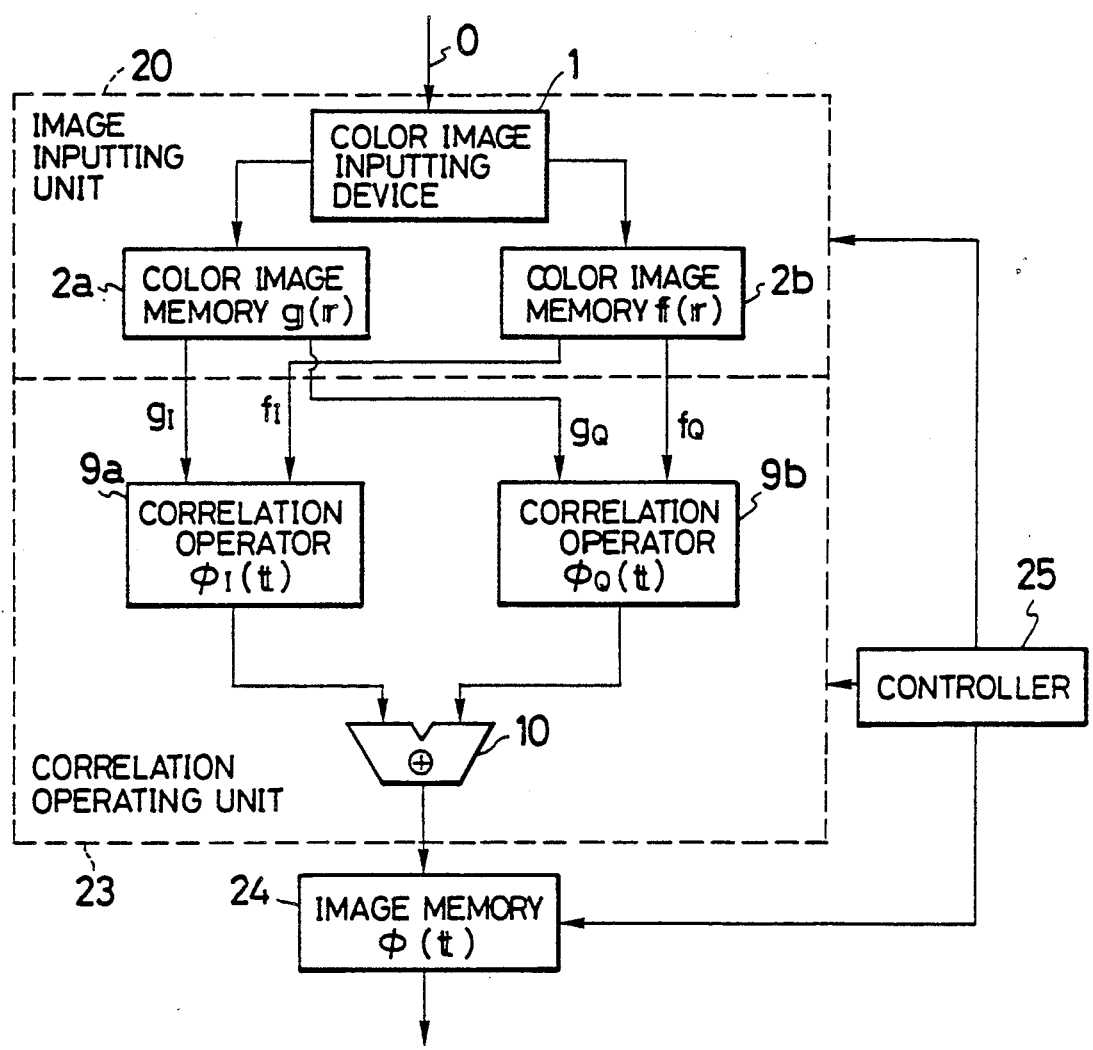
FIG. 11 is a block diagram of a seventh embodiment of the present invention.

FIG. 11 is a block diagram of this embodiment. The input image signals 0 are assumed to be (Y, I, Q) signals. The two input image signals 0 are first input to the color image inputting device 1 where they are converted into digital image signals which have suitable size and gradient and which are each composed of two components of (I, Q). The two types of image signals g(r) and f(r) which are output from the color image inputting device 1 as (I, Q) two-dimensional images are stored in the image memories 2a and 2b, respectively. The two-component images which are represented by the two types of image signals g(r) and f(r) and which are stored in the image memories 2a and 2b are input to the correlation operators 9a and 9b where correlation operations are conducted for each of the I and Q components so as to obtain correlated signals $\phi_I(t)$ and $\phi_Q(t)$. The output signals $\phi_I(t)$ and $\phi_Q(t)$ from the correlation operators 9a and 9b are added to each other by the adder 10, and the results are stored in the image memory 24. The above-described operation of this embodiment is controlled by the controllers 25.

This embodiment utilizes the fact that in a color image, variance of components representing brightness is in general large, and involves correlation operations performed only on two components of a three-dimensional image, such as (I, Q) signals in (Y, I, Q) signals composed of a Y signal representing brightness in color space and two component (I, Q) signals on planes perpendicular thereto. Therefore, highly accurate correlation operations can be performed with a simple structure on signals composed of brightness and two components in planes (hue and saturation planes) perpendicular to brightness.

(Eighth Embodiment)

Figure 12:
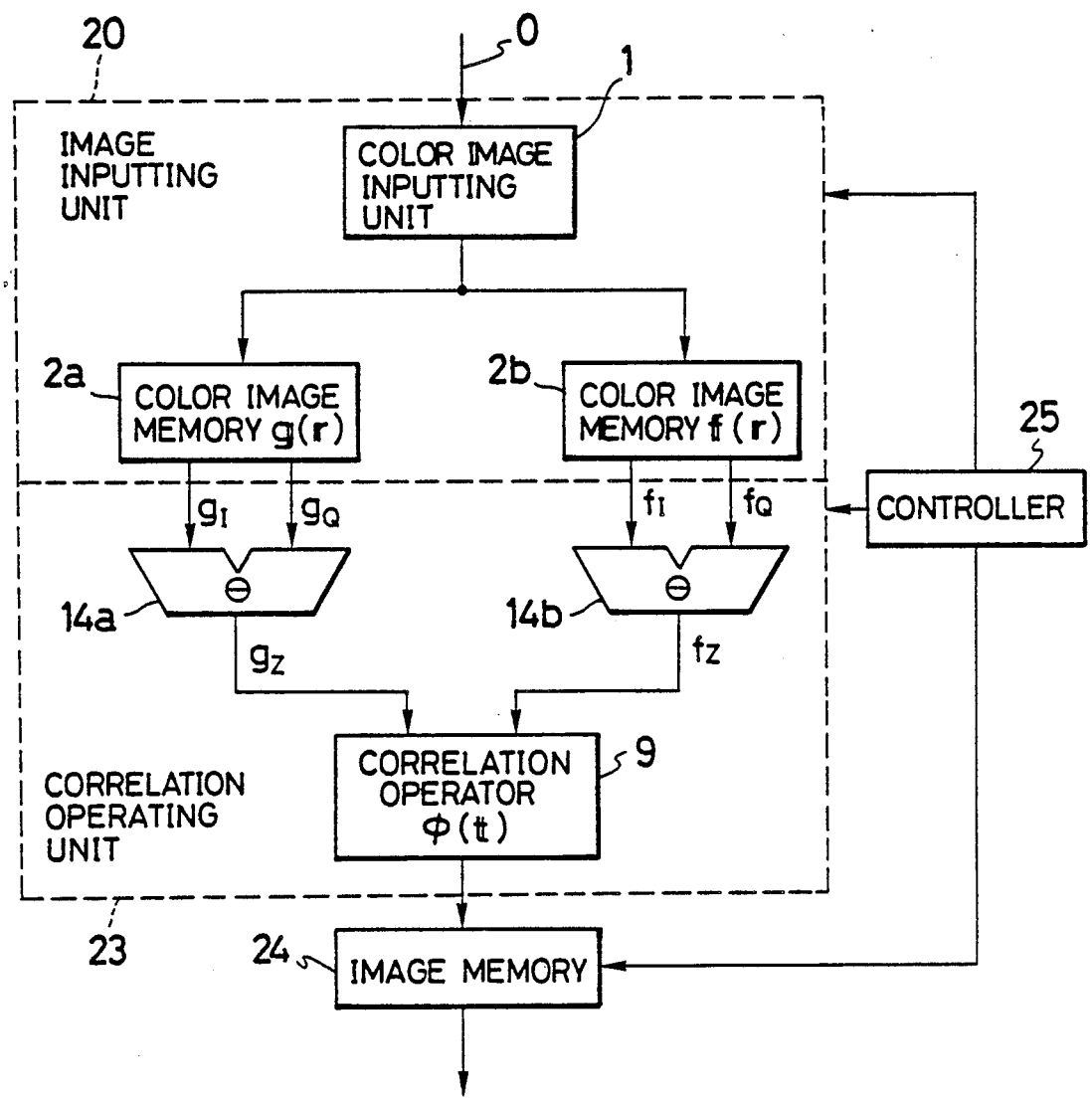
FIG. 12 is a block diagram of an eighth embodiment of the present invention.

The present embodiment involve correlation operations performed on one-dimensional components obtained from the two components of three-dimensional signals, such as (I, Q) components of (Y, I, Q) signals composed of a Y signal representing brightness and biaxial components (I, Q) defined in planes perpendicular to brightness in color space. FIG. 12 is a block diagram of this embodiment. As shown in FIG. 12, the two component image signals $[g_I(r), g_Q(r)]$ and $[f_I(r), f_Q(r)]$ of the two-dimensional image signals g(r) and f(r) which have been input to and stored in the color image memories 2a and 2b in the same manner as in the seventh embodiment are input to the subtracters 14a and 14b, respectively, where subtractions are performed between the components of the signals, i.e., $g_Z(r) = g_I(r) - g_Q(r)$ and $f_Z(r) = f_I(r) - f_Q(r)$ are calculated. The outputs $g_Z(r)$ and $f_Z(r)$ of the subtracters 14a and 14b are input to the correlation operator 9, where a correlation operation is performed thereon, and the results of the operation is stored in the image memory 24. The above-described operation is controlled by the controller 25.

In this embodiment, since the (I, Q) signals of (Y, I, Q) signals which are thought to be effective for correlation operations are linearly combined into one-dimensional signals $g_Z = c_1 g_I + c_2 g_Q$ and $f_Z = c_1 f_I + c_2 f_Q$ and a correlation operation is performed thereon, the quantities of calculations can be further decreased. Although the coefficients ($c_1$, $c_2$) for the above linear combinations may be set to optimal values in accordance with images, it is in general sufficient to set them to (1, −1), the calculations being simplified in this way. Therefore, the present embodiment employs one-dimensional signals $g_Z = g_I - g_Q$ and $f_Z = f_I - f_Q$ which are obtained with the coefficients set to (1, −1).

A linear operator comprised by a multiplication/addition operator or by a look up table memory and an adder may be used to obtain more appropriate one-dimensional signals. A correlation operation conducted only on I or Q signals may ensure substantially the same effect as that of this embodiment.

As will be understood from the foregoing description, according to this embodiment, image signals each of which is composed of brightness and biaxial components in planes perpendicular to the brightness in color space are transformed into one-dimensional signals by linear combination, and a correlation operation is then performed thereon. Therefore, the quantities of calculations can be decreased, thereby reducing the size of the apparatus which is capable of performing the correlation operations with a high degree of accuracy.

(Ninth Embodiment)

Whereas, in the seventh and eighth embodiments, input signals such as (Y, I, Q) signals which are used in the NTSC system and are composed of a signal representing brightness and two component signals defined in planes perpendicular to the brightness in color space are transformed into two- or one-dimensional signals and correlation operations are then performed thereon, the ninth embodiment has a function of transforming input image signals 0 which are color three-dimensional signals, such as (R, G, B) signals, into two-dimensional signals defined in planes perpendicular to a signal representing brightness in color space, so as to ensure the same operation as those of seventh and eighth embodiments, this function being provided by a matrix operator incorporated in the color image inputting device 1.

Figure 13:
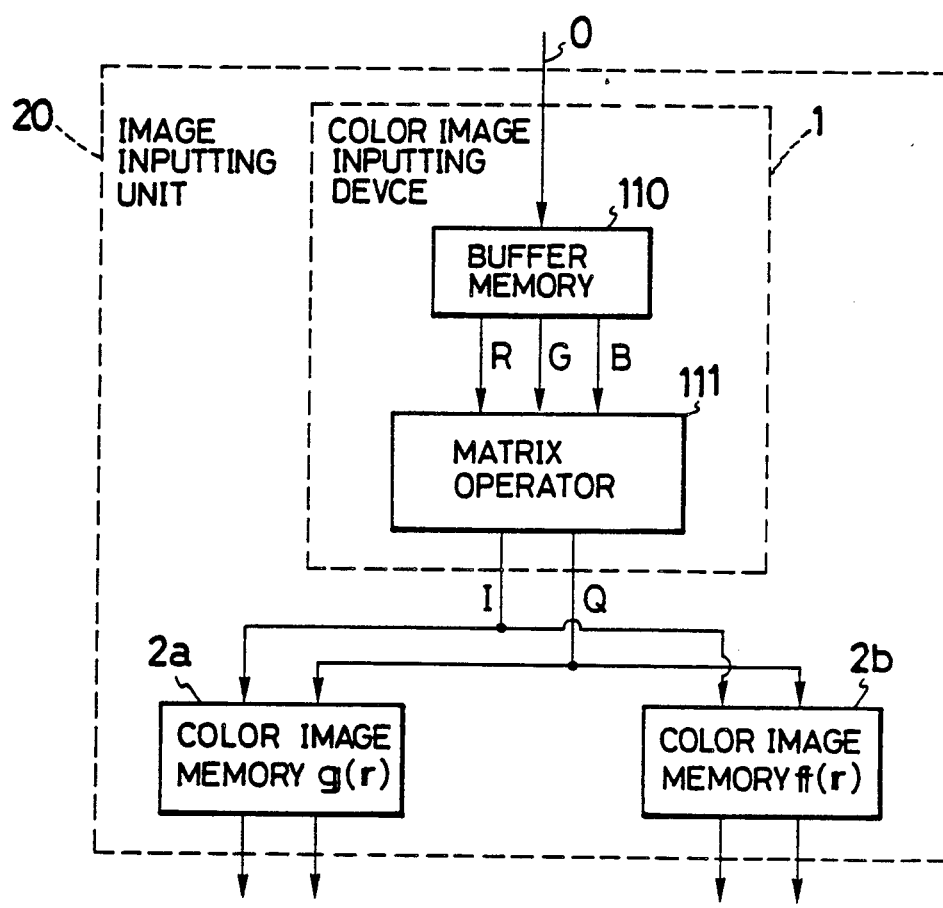
FIG. 13 is a block diagram of a ninth embodiment of the present invention.

FIG. 13 is a block diagram of this embodiment. The input color (R, G, B) three-dimensional signals 0 are stored in a buffer memory 110 in the color image inputting device 1. The (R, G, B) three-dimensional signals stored in the buffer memory 110 are concurrently input to a matrix operator 111 comprised by a multiplication-/addition operator or by a look up table memory and an adder, where linear operation is conducted between the three-dimensional signals so as to obtain two-dimensional (I, Q) signals. The two two-dimensionally output image signals g(r) and f(r) which are output from the color image inputting device 1 as two-dimensional (I, Q) signals are stored in the color image memories 2a and 2b, respectively. Correlation operations are performed in the proceeding process on these image signals in the same manner as in the seventh or eighth embodiment.

Thus, in the present embodiment, two components representing hue and saturation, such as (I, Q) of (Y, I, Q) signals, are obtained from input three-dimensional signals, such as (R, G, B) signals, whose components are not divided into a component representing brightness and two components representing hue and saturation, and correlation operations are then performed thereon in the same manner as in the seventh or eighth embodiment. The process in which the three-dimensional signals are transformed into two-dimensional signals is expressed using matrix operation as follows:

$$\begin{pmatrix} V_1 \\ V_2 \end{pmatrix} = A \begin{pmatrix} I_1 \\ I_2 \\ I_3 \end{pmatrix} = \begin{pmatrix} a_{11} a_{12} a_{13} \\ a_{21} a_{22} a_{23} \end{pmatrix} \begin{pmatrix} I_1 \\ I_2 \\ I_3 \end{pmatrix} \quad (22)$$

wherein transformation matrix A may be a previously defined one, such as that used in (R, G, B) to (I, Q) transformation in an NTSC signal, and which is expressed by:

$$A_{IQ} = \begin{pmatrix} 0.500 & -0.230 & -0.270 \\ 0.202 & -0.500 & 0.298 \end{pmatrix} \quad (23)$$

If only specific types of color image are input, K-L transformation in terms of color such as that described in the first embodiment may be performed on the input image beforehand, and a matrix for transforming the input three-dimensional signal to a secondary or ternary main component signal may be defined as the transformation matrix A.

Thus, in this embodiment, since input three-dimensional image signals such as (R, G, B) which are not divided into a component representing brightness and two components representing hue and saturation, are transformed into two-dimensional signals, and correlation operations are then performed thereon, the quantities of calculations can be decreased, thereby decreasing the size of the apparatus which is capable of conducting correlation operations with a high degree of accuracy.

(Tenth Embodiment)

The tenth embodiment of this invention has a function of transforming input image signals 0 which are color three-dimensional signals such as (R, G, B) signals used in the ninth embodiment into one-dimensional signals defined in a plane perpendicular to the axis representing brightness in color space, the function being provided by a matrix operator incorporated in the color image inputting device 1. FIG. 14 is a block diagram of this embodiment. The color three-dimensional signals 0 are input to the buffer memory 110 in the color image inputting device 1. The three-dimensional signals stored in the buffer memory 110 are concurrently input to a matrix operator 112 comprised by a multiplication/addition operator or by a look up table memory and an adder where linear operation is conducted between the three-dimensional signals so as to obtain new one-dimensional signals. The two one-dimensional image signals $g_Z(r)$ and $f_Z(r)$ which are output from the color image inputting device 1 are input to the color image memories 2a and 2b, respectively. The output signals from the color memories 2a and 2b are input to the correlation operator 9, and the results of the operation $\phi(r)$ is stored in the image memory 24. The above-described operation is controlled by the controller 25.

Thus, in this embodiment, input three-dimensional signals such as (R, G, B) signals which are not divided into a component representing brightness and two components representing hue and saturation are transformed into one-dimensional signals defined in a plane representing hue and saturation in color space, and a correlation operation is then performed between the one-dimensional images. The one-dimensional signal can be expressed using linear combination between three components as follows:

$$V = b_1 I_1 + b_2 I_2 + b_3 I_3 \quad (24)$$

where transformation coefficients ($b_1$, $b_2$, $b_3$) may be ones which are defined beforehand such as I or Q signal in an NTSC signal, or secondary or ternary main components obtained by performing K-L transformation on limited types of images beforehand. Alternatively, they may be components by lineary combining the I and Q signals or the secondary and ternary main components.

Thus, in this embodiment, since input three-dimensional signals such as (R, G, B) signals which are not divided into a component representing brightness and two components representing hue and saturation are transformed into one-dimensional signals and a correlation operation is then performed thereon, the quantities of calculations can be reduced, thereby reducing the size of the apparatus which is capable of conducting correlation operations with a high degree of accuracy.

(Eleventh Embodiment)

Figure 15B:
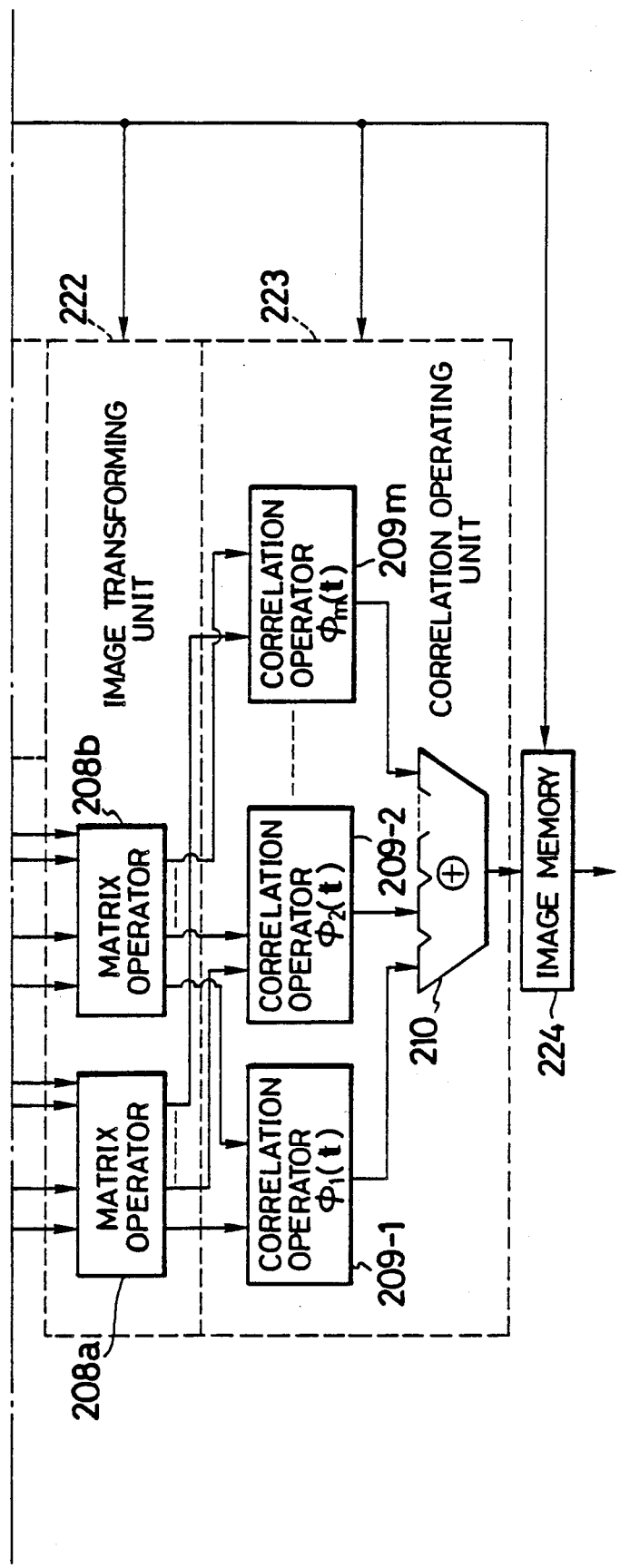

The eleventh embodiment of this invention involves correlation operations performed on multi-dimensional images having at least two dimensions using secondary and following main components in the main components obtained by the main component analysis which have small variance. FIG. 15 is a block diagram of this embodiment. A correlation operational apparatus for multi-dimensional images of this embodiment is roughly comprised by an image inputting unit 220, a main component analyzing unit 221, an image transforming unit 222, a correlation operational unit 223, an image memory 224, and a controller 225 for controlling the operations of these components.

Multi-dimensional input image signals 200 are assumed to be image signals having n dimensions ($n \geq 2$). The multi-dimensional images may be images composed of a plurality of images obtained at a narrow wavelength area by the use of an interference filter, remote sensing images obtained using a plurality of bandwidths, or images composed of a plurality of images obtained under a different illumination condition. Of course, they may be color images.

The multi-dimensional input image signals 200 are converted into multi-dimensional digital image signals having suitable size and gradient by a multi-dimensional image inputting device 201. The two types of image which are output from the multi-dimensional image inputting device 201 are stored in image memories 202a and 202b, respectively. Supposing that the multi-dimensional image stored in the image memory 202b is $f(r) = \{f_1(r), f_2(r), \ldots f_n(r)\}$, n component images $\{f_1, f_2, \ldots f_n\}$ are input to a covariance matrix operator 204 comprised by a squarer, a multiplier, an adder, and a multiplication/addition operator, where a covariance matrix expressed by Equation (25) is calculated, and the results are stored in a memory 205.

$$C = <[f - <f>][f - <f>]^t> \quad (25)$$

$$= \begin{pmatrix} C_{11} C_{12} \ldots C_{1n} \\ C_{21} C_{22} \ldots C_{2n} \\ \vdots \\ C_{n1} C_{n2} \cdots C_{nn} \end{pmatrix}$$

where:
$C_{ij} = <(f_i - <f_i>)(f_j - <f_j>)>$
$i, j = 1, 2, \ldots n$
$<\ >$ is an operator for set mean $$<f> = \frac{1}{N} \sum_{k=1}^{N} f_k;$$

N is the number of picture elements of an image, and
$f = (f_1, f_2, \ldots f_n)^t$.

The covariance matrix element values stored in the memory 205 are input to an eigenvalue operator 206 where n eigenvalues $\alpha_l (l = 1, 2, \ldots n)$ which are a solution for a proper equation expressed by Equation (26) are calculated $$CB = B\Lambda \quad (26)$$

where:
B is a matrix whose column vector is composed of the eigenvector of C, and
$\Lambda$ is a diagonal matrix whose diagonal element is composed of the eigenvalue $\alpha_l$ of C, i.e.,
$B = (b_1, b_2, \ldots b_n)$: $b_l (l = 1, 2, \ldots n)$ is an eigenvector expressed by $b_l = (b_{l1}, b_{l2}, \ldots b_{ln})^t$, and $$\Lambda = \begin{pmatrix} \alpha_1 0 \ldots 0 \\ 0 \alpha_2 \ldots 0 \\ \vdots \\ 0 \ 0 \ldots \alpha_n \end{pmatrix}.$$

In an actual operation, the eigenvalue operator 206 solves the following Equation (27).

$$|C - \alpha_l E| = 0 \ (l = 1, 2, \ldots n) \quad (27)$$

where E is a unit matrix.

If n is small, the eigenvalue operator 206 may be comprised by a multiplier, a divider, an adder, and a look up table memory, like the one which is applied to an operation in which $n = 3$ in the first embodiment. However, the calculation process becomes complicated as n becomes large. In that case, the eigenvalue operator 206 may be comprised by a programmable microprocessor.

Subsequently, the covariance matrix elements stored in the memory 205 and the output $\alpha_l$ from the eigenvalue operator 206 are input to an eigenvector operator 207 where an eigenvector $\alpha_l$ for m eigenvalues $\alpha_l$ ($m < n$) in n eigenvalues $\alpha_l$ is calculated. The eigenvector operator 207 may be comprised by a multiplier, an adder, and a look up table memory. Alternatively, it may be a programmable microprocessor. The eigenvector operator 207 performs calculations which solve Equation (28).

$$(C - \alpha_l E) \cdot b_l = 0 \quad (28)$$

Subsequently, the n-dimensional signals $(g_1, g_2, \ldots g_n)$ and $(f_1, f_2, \ldots f_n)$ of the multi-dimensional images $g(r)$ and $f(r)$ respectively stored in the image memories 202a and 202b are input to matrix operators 208a and 208b each of which is comprised by a multiplication/addition operator or a look up table memory and an adder, respectively. The output $b_l$ from the eigenvector operator 207 is input to both of the matrix operators 208a and 208b, and the two images $g(r)$ and $f(r)$ are projected in the directions of m eigenvectors so as to obtain the following transformed images:

$$g_l'(r) = b_l \cdot g(r)$$
$$= b_{l1} \cdot g_1(r) + b_{l2} \cdot g_2(r) + \ldots + b_{ln} \cdot g_n(r)$$

$$f_l'(r) = b_l \cdot f(r)$$
$$= b_{l1} \cdot f_1(r) + b_{l2} \cdot f_2(r) + \ldots + b_{ln} \cdot f_n(r)$$

The thus-transformed multi-dimensional images $g'(r)$ and $f'(r)$ which are composed of m components are input to correlation operators 209-1 to 209-m for each component where correlation operations are performed thereon. The outputs from the correlation operators 209-1 to 209-m are added by an adder 210, and the output of the adder 210 is stored in an image memory 224.

Thus, in this embodiment, when correlation operations are to be performed on input images which are multi-dimensional images composed of n-dimensional components, the eigenvector directions of the image in the multi-dimensional space and the variances in those directions, i.e., the eigenvalues of the covariance matrix, are obtained by the main component analysis. In that case, the multi-dimensional space is a vector space whose orthogonal axes represent the individual component values of the multi-dimensional components. Then, m eigenvectors having small variance, i.e., having a small eigenvalue, are selected so as to project each of the multi-dimensional images in those m eigenvector directions and thereby decrease the number of dimensions of each of the multi-dimensional images from n to m. m may be a fixed value. Alternatively, it may be any value up to the number of correlation operators 209 which is set by the controller 225 by comparing the magnitude of the m eigenvalues. Thereafter, correlation operations are performed for each component on the multi-dimensional images transformed to m-dimensional images having small variance. In consequence, the quantities of operations are decreased, and correlation operations with a high degree of accuracy are enabled.

As will be understood from the foregoing description, in this embodiment, since a vector which is perpendicular to a vector having large variance in multi-dimensional space is actually obtained by calculations, an optimal projection transformation can be performed on multi-dimensional images. Further, accurate correlation operations requiring small quantities of calculations are enabled.

(Twelfth Embodiment)

Figure 16:
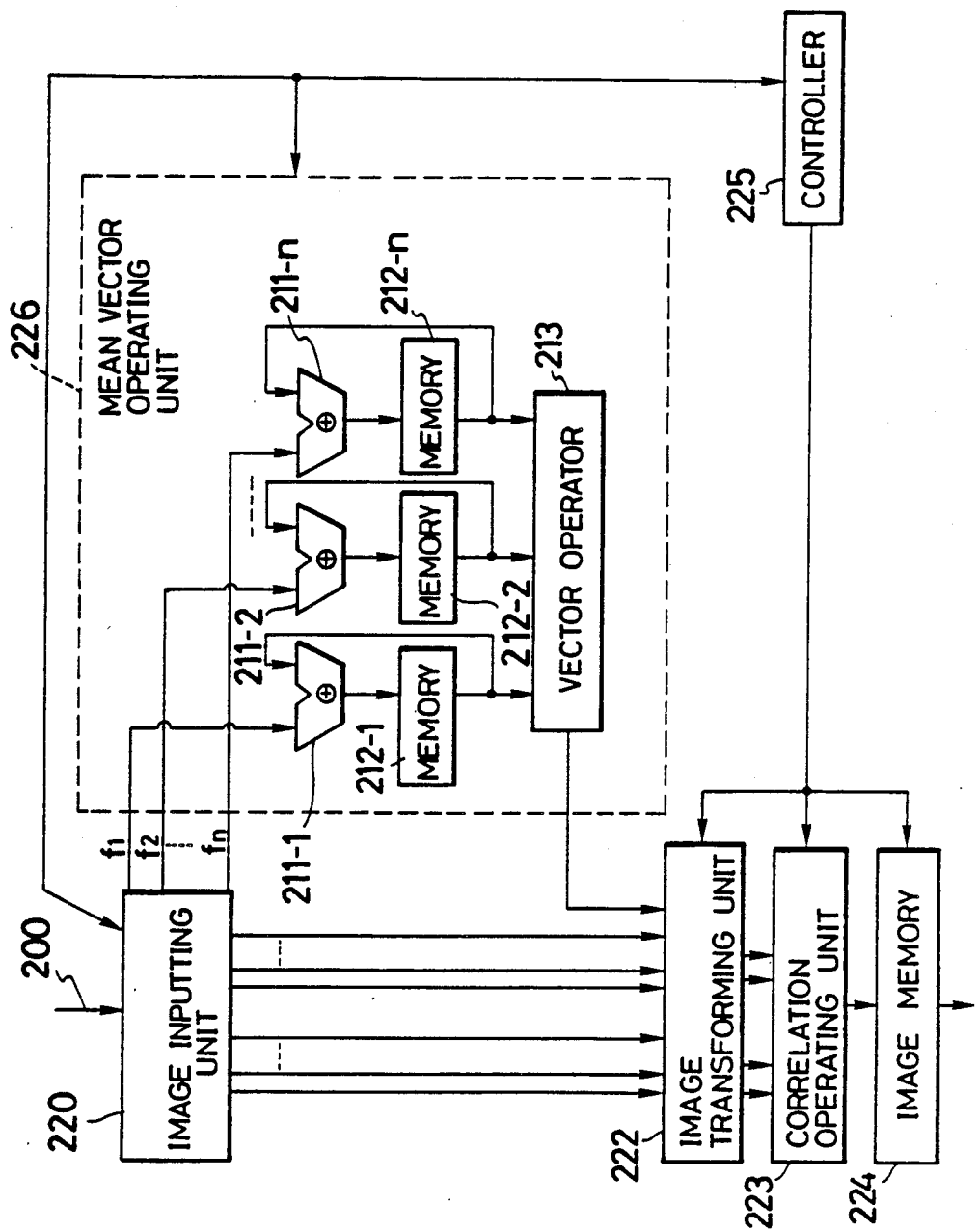
FIG. 16 is a block diagram of a twelfth embodiment of the present invention.

A correlation operational apparatus for multi-dimensional images having at least 2 dimensions of this embodiment includes a mean vector operating unit which substitutes for the main component analyzing unit 221 of the eleventh embodiment. FIG. 16 is a block diagram of this embodiment. As in the eleventh embodiment, n component values $(f_1, f_2, \ldots f_n)$ of one image $f(r)$ of the two multi-dimensional images $f(r)$ and $g(r)$ which have been input to the image inputting unit 220 are input to adders 211-1 to 211-n, respectively, where they are added to the accumulated values of those of the previously input picture elements, and the results are again stored in memories 212-1 to 212-n.

After this addition has been performed on all of the picture elements of the multi-dimensional image $f(r)$, the resultant values $(S_1, S_2, \ldots S_n)$ stored in the memories 212-1 to 212-n are input to a vector operator 213 comprised by a squarer, a multiplier, an adder, and a look up table memory so as to obtain mean vector $d=(d_1, d_2, \ldots d_n)$ first, where:

$$d_1 = \frac{1}{D} S_1, d_2 = \frac{1}{D} S_2, \ldots d_n = \frac{1}{D} S_n, \text{ with}$$

$$D = \sqrt{S_1^2 + S_2^2 + \ldots + S_n^2}.$$

The vector operator 213 then calculates two vectors (u and v) perpendicular to the mean vector d, where u and v are both n-dimensional unit vectors obtained from the relationships of $d \cdot u = d \cdot v = u \cdot v = 0$, $d = u \times v$ and $|u| = |v| = 1$. Although the number of vectors obtained may be any value within $(n-1)$, it is set to 2 in this embodiment to simplify the explanation.

Subsequently, n component values of the two multi-dimensional images $f(r)$ and $g(r)$ stored in the image memories in the image inputting unit 220 as well as the outputs (u and v) from the vector operator 213 are input to the image transforming unit 222 comprised by two matrix operators, where the multi-dimensional images $f(r)$ and $g(r)$ are respectively projected in (u and v) directions so as to transform them into two two-dimensional images $f'(r)=\{f_u(r), f_v(r)\}$ and $g'(r)=\{g_u(r), g_v(r)\}$. Thereafter, correlation operations are performed between the images $f'(r)$ and $g'(r)$ by the correlation operator 223 comprised by two correlation operators and one adder in the same manner as in the first to third embodiments, and the results are stored in the image memory 224.

Only one unit vector u perpendicular to the mean vector d may be calculated by the vector operator 213, so that the multi-dimensional images $f(r)$ and $g(r)$ are projected in the unit vector u direction by the image transforming unit 222 so as to obtain transformed images $f_u(r)$ and $g_u(r)$. These one-dimensional images $f_u(r)$ and $g_u(r)$ are then correlated by a correlation operating unit 223 comprised by one correlation operator, and the results of the correlation are stored in the image memory 224.

This embodiment utilizes the fact that, when there is correlations between the component images of the multi-dimensional images, the main component (the primary main component) direction having the largest variance which is actually obtained in the eleventh embodiment is very close to the mean vector direction obtained in this embodiment. Therefore, in this embodiment, n-dimensional images can be transformed into images having a maximum of $(n-1)$ dimensions which are effective for correlation operations by virtue of the simple operation of mainly adding the components of the multi-dimensional image. In consequence, the calculations and the apparatus which is capable of performing correlation operations at a high degree of accuracy are both simplified.

(Thirteenth Embodiment)

Figure 17:
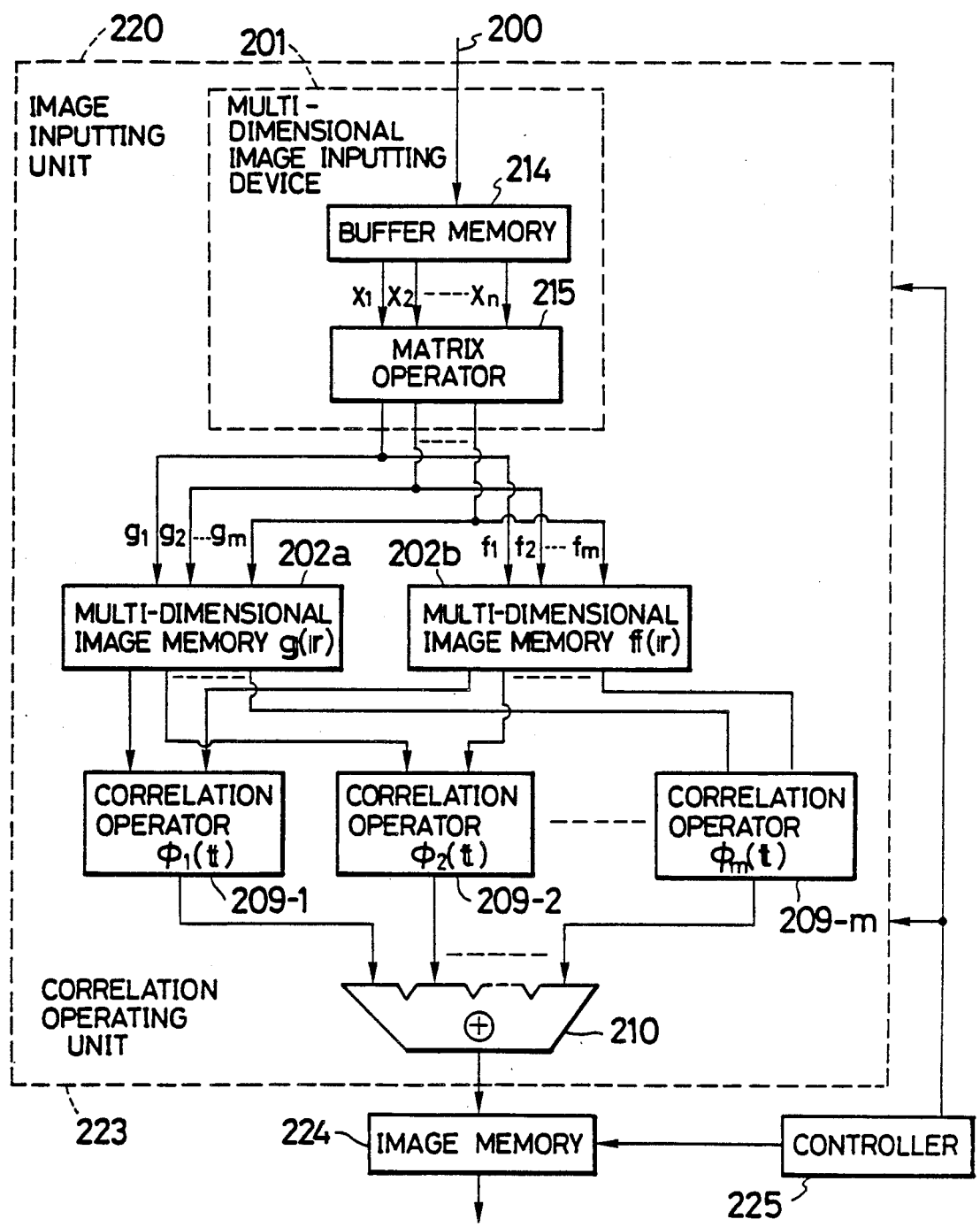
FIG. 17 is a block diagram of a thirteenth embodiment of the present invention.

A thirteenth embodiment of this invention involves reduction of the number of dimensions of input multi-dimensional images whose types are limited and whose distribution in the multi-dimensional space are known by using the previously set transformation matrix without using the main component analyzing unit or the mean vector operating unit. FIG. 17 is a block diagram of this embodiment. The input multi-dimensional image signals 200 having n-dimensional components are temporarily stored in a buffer memory 214 in the multi-dimensional image inputting device 201, and n image component signals from the buffer memory 214 are input to a matrix operator 215, where the n-dimensional signals are transformed into the m-dimensional (m<n) signals using transformation matrix which has been appropriately set beforehand. The two types of multi-dimensional image $g(r)$ and $f(r)$ output from the multi-dimensional image inputting device 201 are stored in multi-dimensional image memories 202a and 202b, respectively The output signals from the multi-dimensional image memories 202a and 202b are input for each component to the correlation operators 209-1 to 209-m where correlation operations are performed thereon. The outputs from the correlation operators 209-1 to 209-m are input to the adder 210 where they are added to obtain the total sum thereof, and the results are stored in the image memory 24. If the n-dimensional signals are transformed into one-dimensional signals by the matrix operator 215, no adder 210 is necessary. The above-described operation is controlled by the controller 225.

This embodiment is applied to a case in which only specific types of multi-dimensional image are input which enables estimation of the largest variance direction in the multi-dimensional space. Transformation matrix used to decrease the number of dimensions of the input multi-dimensional images may be set by performing K-L transformation on an object image group or the image group of the same type as the object image group or by obtaining mean vector. Therefore, the same correlation operations as those in the eleventh or twelfth embodiment can be provided without incorporating a main component analyzing unit or a mean vector operating unit.

Thus, in the present embodiment, multi-dimensional images whose largest variance direction in the multi-dimensional space can be presumed are correlated. Therefore, the quantities of calculations can be greatly decreased, decreasing the size of the apparatus which is capable of performing correlation operations with a high degree of accuracy.

As can be seen from the foregoing description, the present invention can be applied to stereo matching of color images which is conducted to grasp an object three-dimensionally in various fields such as extraction of contours from aerial photographs, analysis of stereographic surface structure of an object using endoscopic or microscopic images, and robot vision by a plurality of color images input from one movable camera or a plurality of cameras.

The present invention can also be adopted to the automatic focusing mechanism of a camera or a microscope so as to enable the accuracy of the known mechanism to be improved. The present invention can also be applied to automatic recognition technique of microscopic images which is used in the fields of cytodiagnosis in medical science, biology, earth science or examinations of metal materials. This means that an accuracy with which objects are determined in any of the above-mentioned fields can be improved because of use of color information in addition to the form thereof This may lead to enlargement of the application fields of the technique. Applications of this invention on an industrial basis includes painting inspection in a production line, a robot vision which recognizes both color and form, and a automatic sorting machine for perishable food In any of these cases, application of this invention enables a color as well as a form to be used as parameters.

What is claimed is:

1. A correlation operational apparatus for correlation of objects between multi-dimensional images each composed of at least two components, said correlation operational apparatus comprising:

means for reducing at least two-dimensional components of said multi-dimensional images composed of at least two components by at least one component by projecting a first vector, representing said images, onto a projection plane which is perpendicular to a second vector, said second vector representing a large variance of distribution of said multi-dimensional images in a vector space, said vector space having orthogonal axes represent individual dimensional component values of said multi-dimensional images; and means for performing a correlation operation among said multi-dimensional images for each component on the multi-dimensional images whose dimensional components have been reduced by at least one to correlate objects within said multi-dimensional images.

2. A correlation operational apparatus for multi-dimensional images comprising:

an image inputting unit including n-dimensional ($n \geq 2$) image inputting devices and image memories;

a main component analyzing unit including a covariance matrix operator, a memory, an eigenvalue operator, and an eigenvector operator calculating m ($m < n$) vectors, said vectors representing a small variance of distribution of an image in n-dimensional vector space;

an image transforming unit including matrix operators for transforming n-dimensional input images into m-dimensional images by projecting said n-dimensional images in directions of said m vectors;

a correlation operating unit including m correlation operators performing correlation of objects within the multi-dimensional images;

an image memory for storing a correlated image produced by said correlation operating unit; and a controller for controlling an operation of each of said units.

* * * * *